US012771464B2

(12) United States Patent
Elshafie et al.

(10) Patent No.: US 12,771,464 B2
(45) Date of Patent: Oct. 20, 2026

(54) CHANNEL METRIC REPORTING

(71) Applicant: QUALCOMM Incorporated, San Diego, CA (US)

(72) Inventors: Ahmed Elshafie, San Diego, CA (US); Wei Yang, San Diego, CA (US); Huilin Xu, Temecula, CA (US); Muhammad Sayed Khairy Abdelghaffar, San Jose, CA (US); Yi Huang, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 18/187,518

(22) Filed: Mar. 21, 2023

(65) Prior Publication Data

US 2024/0322922 A1 Sep. 26, 2024

(51) Int. Cl.

| | |
|---|---|
| ***H04B 17/345*** | (2015.01) |
| ***H04B 7/06*** | (2006.01) |
| ***H04L 1/00*** | (2006.01) |
| ***H04W 8/24*** | (2009.01) |

(52) U.S. Cl.

CPC ......... *H04B 17/345* (2015.01); *H04B 7/0626* (2013.01); *H04L 1/0026* (2013.01); *H04W 8/24* (2013.01)

(58) Field of Classification Search

CPC ..... H04B 7/0626; H04B 17/345; H04W 8/24; H04W 24/10

See application file for complete search history.

(56) References Cited

U.S. PATENT DOCUMENTS

| | | | | |
|---|---|---|---|---|
| 2021/0006438 | A1* | 1/2021 | Harrebek | H04W 24/10 |
| 2021/0328746 | A1* | 10/2021 | Sandberg | H04L 5/006 |

FOREIGN PATENT DOCUMENTS

| | | | | |
|---|---|---|---|---|
| WO | WO-2022084457 A1 * | 4/2022 | | G06N 7/01 |
| WO | 2022234486 A1 | 11/2022 | | |
| WO | 2023272717 A1 | 1/2023 | | |

OTHER PUBLICATIONS

International Search Report and Written Opinion—PCT/US2024/019224—ISA/EPO—Oct. 17, 2024.

Partial International Search Report—PCT/US2024/019224—ISA/EPO—Jul. 17, 2024.

* cited by examiner

*Primary Examiner* — Sulaiman Nooristany

(74) *Attorney, Agent, or Firm* — QUALCOMM Incorporated

(57) ABSTRACT

Various aspects of the present disclosure generally relate to wireless communication. In some aspects, a user equipment (UE) may transmit a capability indicator identifying an interference pattern monitoring capability. The UE may receive, based at least in part on transmitting the capability indicator, a request to monitor for a set of interference patterns. The UE may transmit, as a response to the request, a report regarding the set of interference patterns. Numerous other aspects are described.

30 Claims, 16 Drawing Sheets

CHANNEL METRIC REPORTING

FIELD OF THE DISCLOSURE

Aspects of the present disclosure generally relate to wireless communication and to techniques and apparatuses for channel metric reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a capability indicator identifying an interference pattern monitoring capability. The method may include receiving, based at least in part on transmitting the capability indicator, a request to monitor for a set of interference patterns. The method may include transmitting, as a response to the request, a report regarding the set of interference patterns.

Some aspects described herein relate to a method of wireless communication performed by a UE. The method may include receiving, from a plurality of network nodes, a set of downlink messages. The method may include transmitting, as a response to the set of downlink messages, one or more channel state information (CSI) reports, wherein a quantity of the one or more CSI reports is based at least in part on a characteristic of the set of downlink messages.

Some aspects described herein relate to a method of wireless communication performed by a network node. The method may include receiving a capability indicator identifying an interference pattern monitoring capability. The method may include transmitting, based at least in part on receiving the capability indicator, a request to monitor for a set of interference patterns. The method may include receiving, as a response to the request, a report regarding the set of interference patterns.

Some aspects described herein relate to a method of wireless communication performed by a network node. The method may include transmitting, from a plurality of network nodes, a set of downlink messages. The method may include receiving, as a response to the set of downlink messages, one or more CSI reports, wherein a quantity of the one or more CSI reports is based at least in part on a characteristic of the set of downlink messages.

Some aspects described herein relate to a UE for wireless communication. The UE may include a memory and one or more processors coupled to the memory. The one or more processors may be configured to transmit a capability indicator identifying an interference pattern monitoring capability. The one or more processors may be configured to receive, based at least in part on transmitting the capability indicator, a request to monitor for a set of interference patterns. The one or more processors may be configured to transmit, as a response to the request, a report regarding the set of interference patterns.

Some aspects described herein relate to a UE for wireless communication. The UE may include a memory and one or more processors coupled to the memory. The one or more processors may be configured to receive, from a plurality of network nodes, a set of downlink messages. The one or more processors may be configured to transmit, as a response to the set of downlink messages, one or more CSI reports, wherein a quantity of the one or more CSI reports is based at least in part on a characteristic of the set of downlink messages.

Some aspects described herein relate to a network node for wireless communication. The network node may include a memory and one or more processors coupled to the memory. The one or more processors may be configured to receive a capability indicator identifying an interference pattern monitoring capability. The one or more processors may be configured to transmit, based at least in part on receiving the capability indicator, a request to monitor for a set of interference patterns. The one or more processors may be configured to receive, as a response to the request, a report regarding the set of interference patterns.

Some aspects described herein relate to a network node for wireless communication. The network node may include a memory and one or more processors coupled to the memory. The one or more processors may be configured to transmit, from a plurality of network nodes, a set of downlink messages. The one or more processors may be configured to receive, as a response to the set of downlink messages, one or more CSI reports, wherein a quantity of the one or more CSI reports is based at least in part on a characteristic of the set of downlink messages.

Some aspects described herein relate to a non-transitory computer-readable medium that stores a set of instructions for wireless communication by a UE. The set of instructions, when executed by one or more processors of the UE, may cause the UE to transmit a capability indicator identifying an interference pattern monitoring capability. The set of instructions, when executed by one or more processors of the UE, may cause the UE to receive, based at least in part on transmitting the capability indicator, a request to monitor for a set of interference patterns. The set of instructions, when executed by one or more processors of the UE, may cause the UE to transmit, as a response to the request, a report regarding the set of interference patterns.

Some aspects described herein relate to a non-transitory computer-readable medium that stores a set of instructions for wireless communication by a UE. The set of instructions, when executed by one or more processors of the UE, may cause the UE to receive, from a plurality of network nodes, a set of downlink messages. The set of instructions, when executed by one or more processors of an UE, may the UE to transmit, as a response to the set of downlink messages, one or more CSI reports, wherein a quantity of the one or more CSI reports is based at least in part on a characteristic of the set of downlink messages.

Some aspects described herein relate to a non-transitory computer-readable medium that stores a set of instructions for wireless communication by a network node. The set of instructions, when executed by one or more processors of the network node, may cause the network node to receive a capability indicator identifying an interference pattern monitoring capability. The set of instructions, when executed by one or more processors of the network node, may cause the network node to transmit, based at least in part on receiving the capability indicator, a request to monitor for a set of interference patterns. The set of instructions, when executed by one or more processors of the network node, may cause the network node to receive, as a response to the request, a report regarding the set of interference patterns.

Some aspects described herein relate to a non-transitory computer-readable medium that stores a set of instructions for wireless communication by a network node. The set of instructions, when executed by one or more processors of the network node, may cause the network node to transmit, from a plurality of network nodes, a set of downlink messages. The set of instructions, when executed by one or more processors of the network node, may cause the network node to receive, as a response to the set of downlink messages, one or more CSI reports, wherein a quantity of the one or more CSI reports is based at least in part on a characteristic of the set of downlink messages.

Some aspects described herein relate to an apparatus for wireless communication. The apparatus may include means for transmitting a capability indicator identifying an interference pattern monitoring capability. The apparatus may include means for receiving, based at least in part on transmitting the capability indicator, a request to monitor for a set of interference patterns. The apparatus may include means for transmitting, as a response to the request, a report regarding the set of interference patterns.

Some aspects described herein relate to an apparatus for wireless communication. The apparatus may include means for receiving, from a plurality of network nodes, a set of downlink messages. The apparatus may include means for transmitting, as a response to the set of downlink messages, one or more CSI reports, wherein a quantity of the one or more CSI reports is based at least in part on a characteristic of the set of downlink messages.

Some aspects described herein relate to an apparatus for wireless communication. The apparatus may include means for receiving a capability indicator identifying an interference pattern monitoring capability. The apparatus may include means for transmitting, based at least in part on receiving the capability indicator, a request to monitor for a set of interference patterns. The apparatus may include means for receiving, as a response to the request, a report regarding the set of interference patterns.

Some aspects described herein relate to an apparatus for wireless communication. The apparatus may include means for transmitting, from a plurality of network nodes, a set of downlink messages. The apparatus may include means for receiving, as a response to the set of downlink messages, one or more CSI reports, wherein a quantity of the one or more CSI reports is based at least in part on a characteristic of the set of downlink messages.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
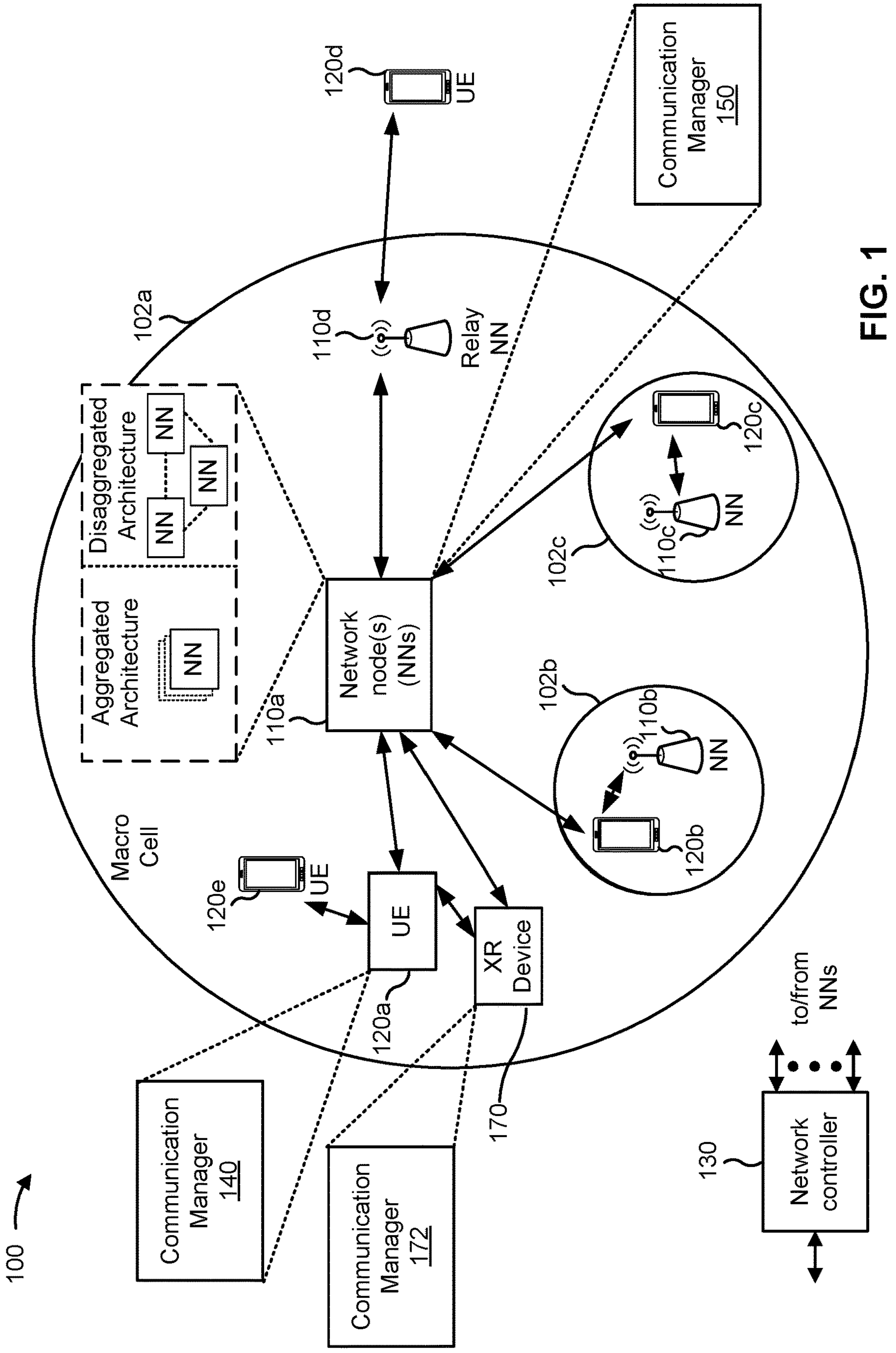
FIG. 1 is a diagram illustrating an example of a wireless network, in accordance with the present disclosure.

In increasingly dense communications systems, interference may affect a reliability of communications between different devices. For example, a user equipment (UE) may experience interference when communicating with one or more other devices. Interference may be a particular problem for some types of communications, such as extended reality (XR) communications, ultra-reliable low-latency communications (URLLC), or sidelink communications, among other examples, that may have low reliability when interference occurs. For example, some communications may have relatively low signal strengths, be used in particularly dense wireless networks (e.g., wireless networks with large quantities of devices), rely on contention-based access resources or an unlicensed spectrum, or use limited resources that reduce redundancy, among other examples.

A network node may provide interference management assistance to devices in a wireless network. For example, a network node may schedule resources, alter communication configurations, or provide information identifying reported interference sources to UEs or XR devices to enable interference avoidance or mitigation. Interference reporting may include information regarding identified interference during a particular period of time, which may result in static control of interference avoidance or mitigation techniques. However, some interference sources may be periodic, resulting in the interference reporting failing to account for recurrences of interference, which may result in inadequate interference avoidance or mitigation and poor communication reliability.

Some aspects described herein may enable a UE to provide interference reporting associated with a set of different interference sources, and may enable a network node to characterize the set of interference sources and/or a set of interference patterns associated therewith. In this way, the network node can control interference avoidance or mitigation techniques more accurately, which improves reliability of communications in, for example, XR, URLLC, or sidelink communications deployments. In some of the above-mentioned deployments, there may be multiple transmit receive points (TRPs), communications with which are scheduled using, for example, one or more downlink control information (DCI) messages. In this case, a UE may be configured to transmit channel state information (CSI) reporting for a multi-TRP deployment based at least in part on a characteristic of the DCI. In this way, the UE can provide reporting regarding observed channel conditions, which can be used for, for example, configuring interference avoidance or mitigation techniques.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a TRP, a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, the wireless network 100 may include an XR device 170. For example, an XR device 170 may communicate with a network node 110 (e.g., via an access link) and/or a UE 120 (e.g., via a sidelink). In some examples, an XR device 170 may be an example of a UE 120. In other words, some UEs 120 may be XR devices 170. XR functionalities may include augmented reality (AR), virtual reality (VR), or mixed reality (MR), among other examples. For example, when providing an XR service, the XR device 170 may provide rendered data via a display, such as a screen, a set of VR goggles, a heads-up display, or another type of display.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the XR device 170 may include a communication manager 172. As described in more detail elsewhere herein with regard to the UE 120, the communication manager 172 may perform a measurement for identifying an interference pattern. Additionally, or alternatively, the communication manager 172 may perform one or more other operations described herein.

In some aspects, the UE 120 may include a communication manager 140. As described in more detail elsewhere herein, the communication manager 140 may transmit a capability indicator identifying an interference pattern monitoring capability; receive, based at least in part on transmitting the capability indicator, a request to monitor for a set of interference patterns; and transmit, as a response to the request, a report regarding the set of interference patterns. Additionally, or alternatively, the communication manager 140 may receive, from a plurality of network nodes, a set of downlink messages; and transmit, as a response to the set of downlink messages, one or more CSI reports, wherein a quantity of the one or more CSI reports is based at least in part on a characteristic of the set of downlink messages. Additionally, or alternatively, the communication manager 140 may perform one or more other operations described herein.

In some aspects, the network node 110 may include a communication manager 150. As described in more detail elsewhere herein, the communication manager 150 may receive a capability indicator identifying an interference pattern monitoring capability; transmit, based at least in part on receiving the capability indicator, a request to monitor for a set of interference patterns; and receive, as a response to the request, a report regarding the set of interference patterns. Additionally, or alternatively, the communication manager 150 may transmit, from a plurality of network nodes, a set of downlink messages; and receive, as a response to the set of downlink messages, one or more CSI reports, wherein a quantity of the one or more CSI reports is based at least in part on a characteristic of the set of downlink messages. Additionally, or alternatively, the communication manager 150 may perform one or more other operations described herein.

As indicated above, FIG. 1 is provided as an example. Other examples may differ from what is described with regard to FIG. 1.

Figure 2:
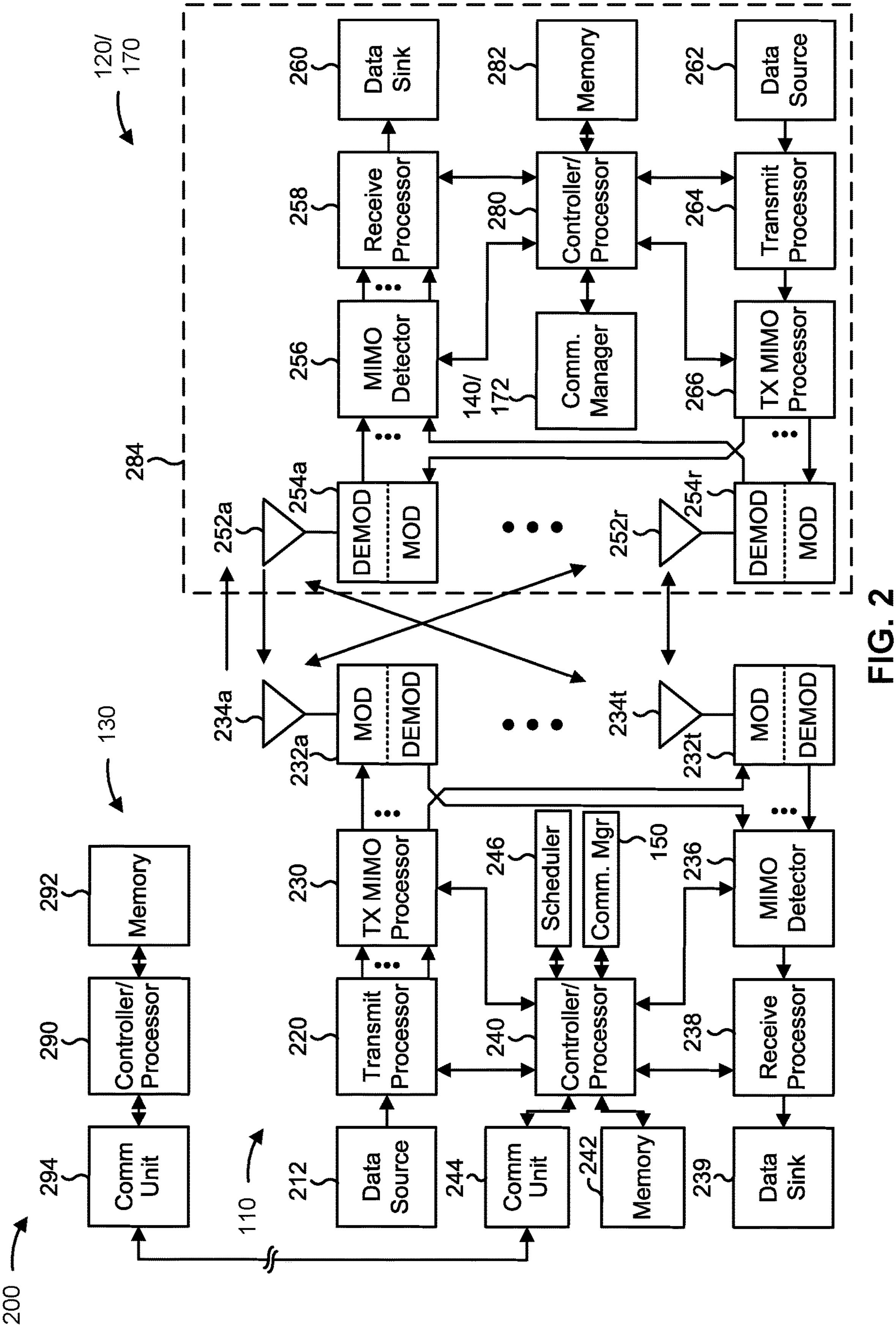
FIG. 2 is a diagram illustrating an example of a network node in communication with a user equipment (UE) or an extended reality (XR) device in a wireless network, in accordance with the present disclosure.

FIG. 2 is a diagram illustrating an example 200 of a network node 110 in communication with a UE 120 or the XR device 170 in a wireless network 100, in accordance with the present disclosure. Although some aspects are described in terms of communication between the network node 110 and a UE 120 or an XR device 170, aspects described herein may apply to communication between a UE 120 and an XR device 170, communication between a plurality of UEs 120, or communication between a plurality of XR devices 170, among other examples.

The network node 110 may be equipped with a set of antennas 234*a* through 234*t*, such as T antennas (T≥1). The UE 120 or the XR device 170 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or the XR device 170 or another network node. Some network nodes 110 may not include radio frequency components that facilitate direct communication with the UE 120 or the XR device 170, such as one or more CUs, or one or more DUs.

At the network node 110, a transmit processor 220 may receive data, from a data source 212, intended for the UE 120 or the XR device 170 (or a set of UEs 120 or a set of XR devices 170). The transmit processor 220 may select one or more modulation and coding schemes (MCSs) for the UE 120 or the XR device 170 based at least in part on one or more channel quality indicators (CQIs) received from that UE 120 or the XR device 170. The network node 110 may process (e.g., encode and modulate) the data for the UE 120 or the XR device 170 based at least in part on the MCS(s) selected for the UE 120 or the XR device 170 and may provide data symbols for the UE 120 or the XR device 170. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120 or the XR device 170, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 or the XR device 170 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 or the XR device 170 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120 or the XR device 170, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 or the XR device 170 may include a modulator and a demodulator. In some examples, the UE 120 or the XR device 170 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 or the XR device 170 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120 or the XR device 170. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120 or the XR device 170, and/or any other component(s) of FIG. 2 may perform one or more techniques associated with channel metric reporting, as described in more detail elsewhere herein. For example, the controller/processor 240 of the network node 110, the controller/processor 280 of the UE 120 or the XR device 170, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the network node 110 and the UE 120 or the XR device 170, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120 or the XR device 170, may cause the one or more processors, the UE 120 or the XR device 170, and/or the network node 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for transmitting a capability indicator identifying an interference pattern monitoring capability; means for receiving, based at least in part on transmitting the capability indicator, a request to monitor for a set of interference patterns; and/or means for transmitting, as a response to the request, a report regarding the set of interference patterns. In some aspects, the UE 120 includes means for receiving, from a plurality of network nodes, a set of downlink messages; and/or means for transmitting, as a response to the set of downlink messages, one or more CSI reports, wherein a quantity of the one or more CSI reports is based at least in part on a characteristic of the set of downlink messages. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a capability indicator identifying an interference pattern monitoring capability; means for transmitting, based at least in part on receiving the capability indicator, a request to monitor for a set of interference patterns; and/or means for receiving, as a response to the request, a report regarding the set of interference patterns. In some aspects, the network node 110 includes means for transmitting, from a plurality of network nodes, a set of downlink messages; and/or means for receiving, as a response to the set of downlink messages, one or more CSI reports, wherein a quantity of the one or more CSI reports is based at least in part on a characteristic of the set of downlink messages. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
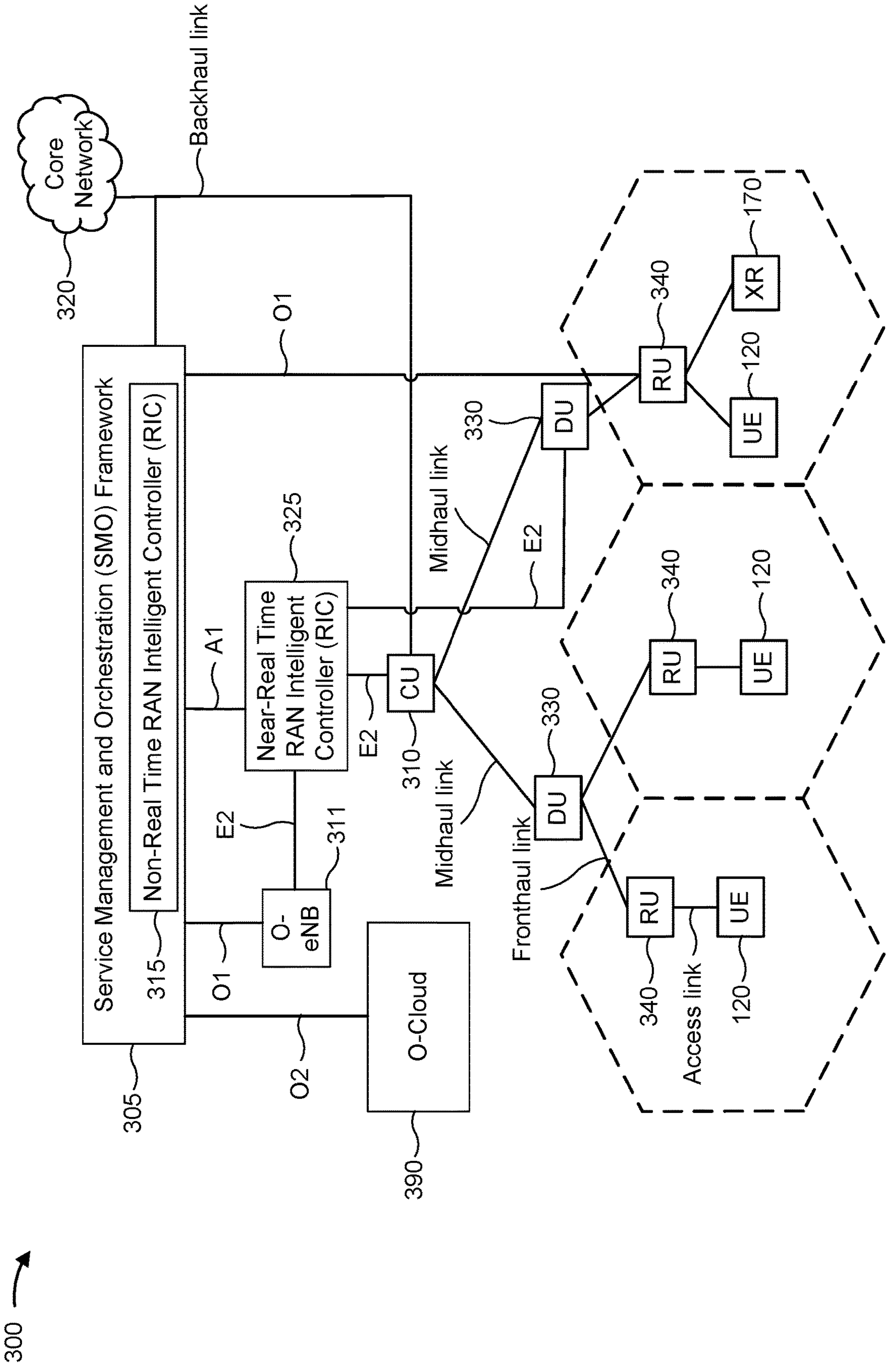
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 or XR devices 170 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120 or XR devices 170. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
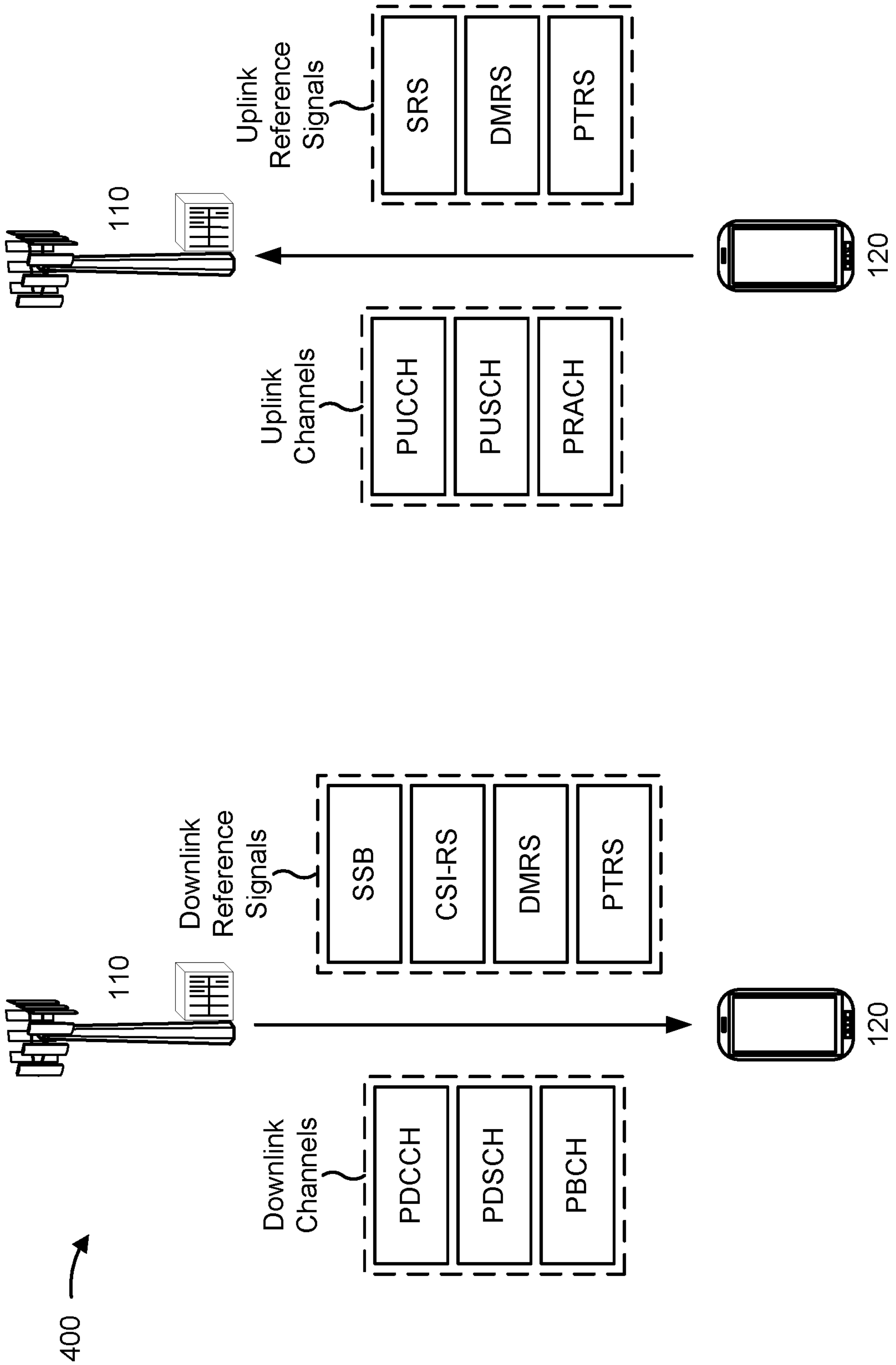
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some examples, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some examples, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
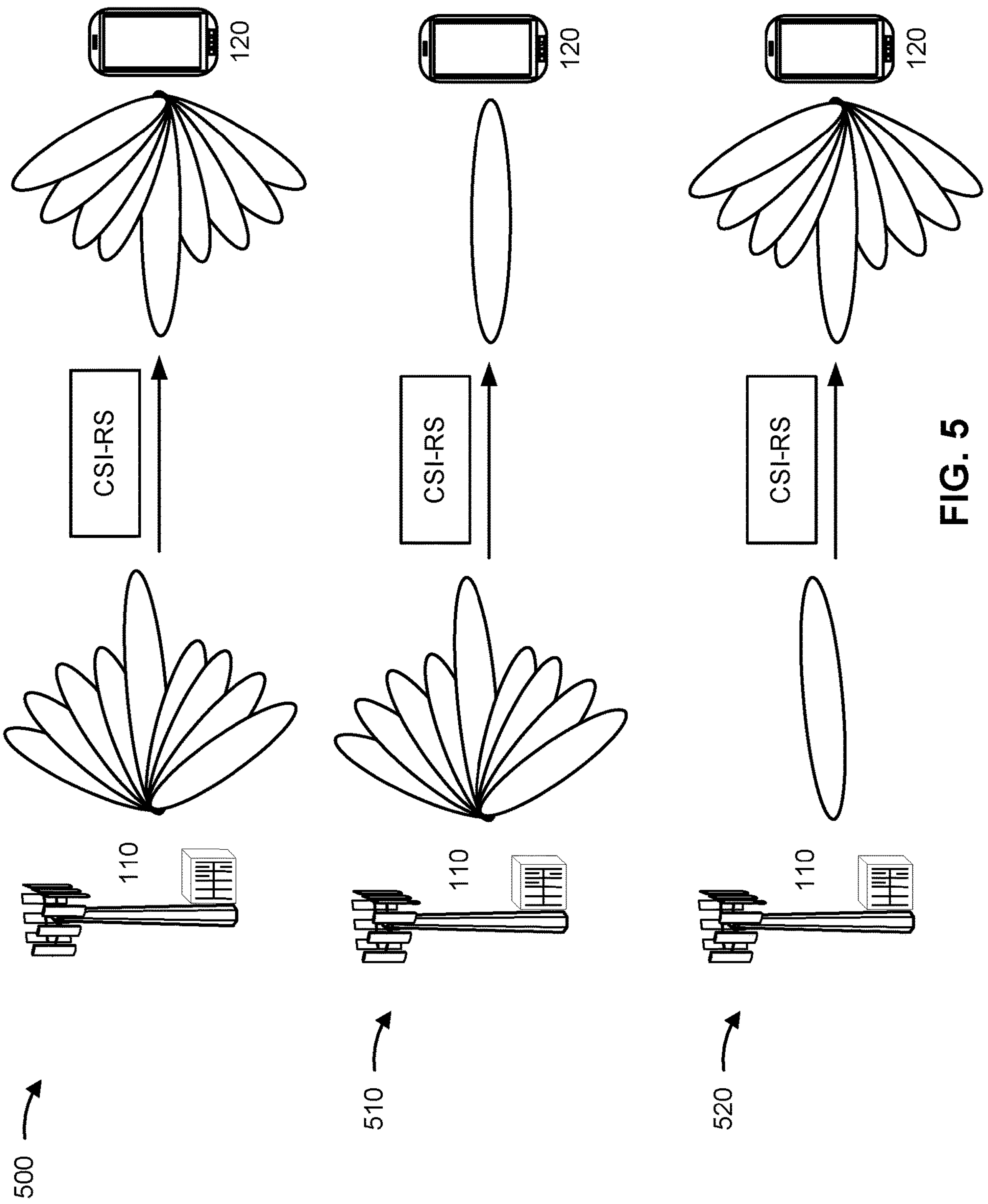
FIG. 5 is a diagram illustrating examples of channel state information reference signal beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a network node 110 in a wireless network (e.g., wireless network 100). However, the devices shown in FIG. 5 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some examples, the UE 120 and the network node 110 may be in a connected state (e.g., an RRC connected state).

As shown in FIG. 5, example 500 may include a network node 110 (e.g., one or more network node devices such as an RU, a DU, and/or a CU, among other examples) and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using MAC control element (CE) (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. For example, the UE 120 may transmit a CSI report that includes information identifying one or more measurements or a CQI, among other examples. While example 500 has been described in connection with CSI-RSs, the first beam management process may also use SSBs for beam management in a similar manner as described above.

As shown in FIG. 5, example 510 may include a network node 110 and a UE 120 communicating to perform beam management using CSI-RSs. Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5 and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 5 is provided as an example of beam management procedures. Other examples of beam management procedures may differ from what is described with respect to FIG. 5. For example, the UE 120 and the network node 110 may perform the third beam management procedure before performing the second beam management procedure, and/or the UE 120 and the network node 110 may perform a similar beam management procedure to select a UE transmit beam.

Figure 6:
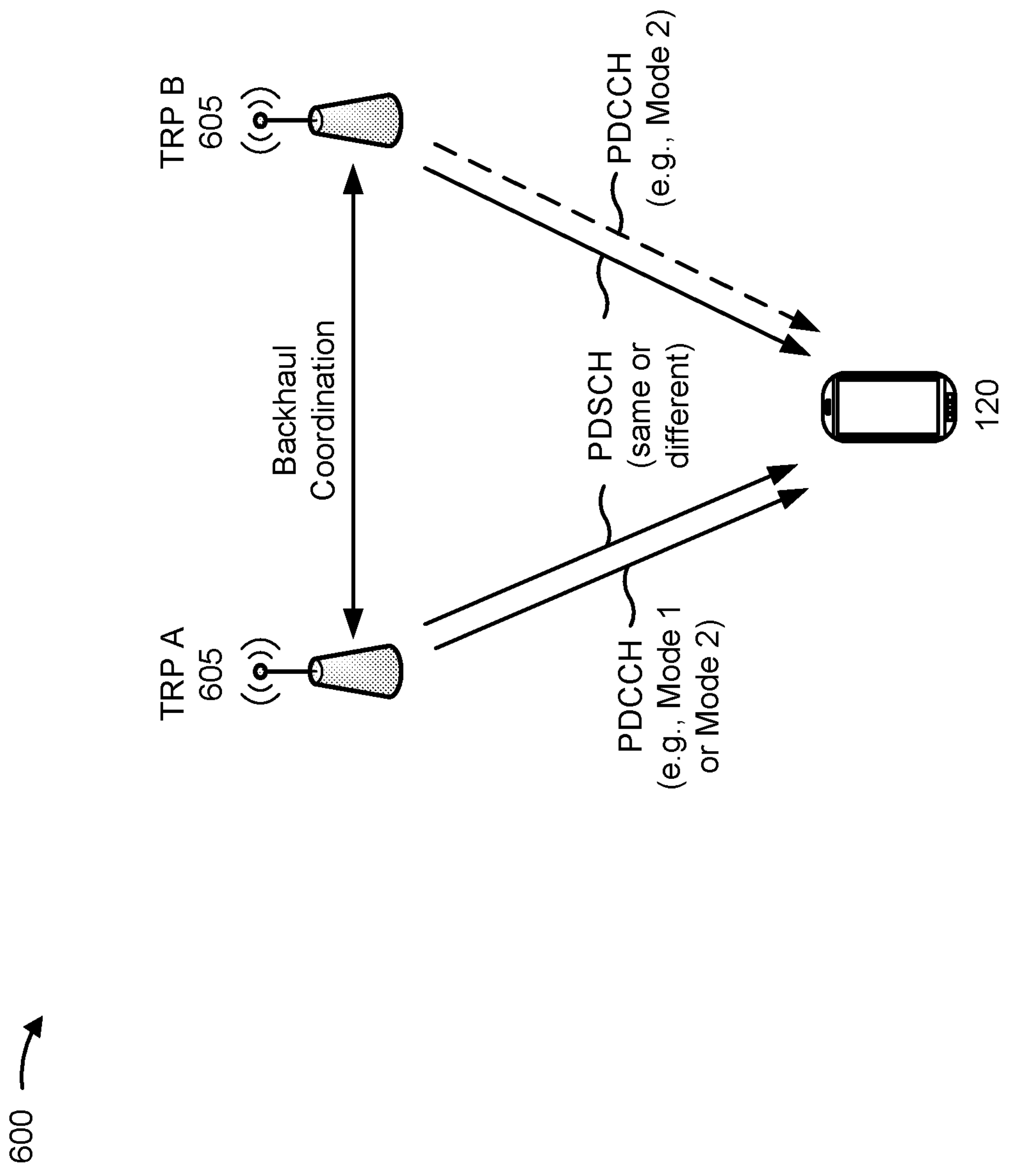
FIG. 6 is a diagram illustrating an example of multiple transmit receive point communication, in accordance with the present disclosure.

FIG. 6 is a diagram illustrating an example 600 of multi-TRP communication (sometimes referred to as multi-panel communication), in accordance with the present disclosure. As shown in FIG. 6, multiple TRPs 605 may communicate with the same UE 120.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller). The interface may have a smaller delay and/or higher capacity when the TRPs 605 are co-located at the same network node 110 (e.g., when the TRPs 605 are different antenna arrays or panels of the same network node 110), and may have a larger delay and/or lower capacity (as compared to co-location) when the TRPs 605 are located at different network nodes 110. The different TRPs 605 may communicate with the UE 120 using different quasi-co-location (QCL) relationships (e.g., different transmission configuration indicator (TCI) states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some examples, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In another example of Mode 1 multi-TRP transmission, a single PDCCH (e.g., a single DCI) is used for scheduling one codeword (CW) transmission with different spatial layers being transmitted by different TRPs. In this example, one CW transmission maps to 4 layers with layers 1 and 2 being transmitted by a first TRP 605 and layers 3 and 4 being transmitted by a second TRP 605. Mode 1 multi-TRP transmission may be used, for example, when a backhaul delay between different TRPs is relatively small.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

In another example of Mode-2 multi-TRP transmission, two PDCCHs (e.g., two DCI transmissions) are used for scheduling two CW transmissions. In this example, a first PDCCH schedules a first CW transmission (e.g., a PDSCH) from a first TRP 605 and a second PDCCH schedules a second CW transmission from a second TRP 605 (the first CW transmission may or may not at least partially overlap with the second CW transmission (e.g., a second PDSCH) in terms of time domain resources or frequency domain resources). In some examples, Mode-2 multi-TRP transmission may be used for both scenarios in which a backhaul delay between different TRPs is relatively small and for scenarios in which the backhaul delay between different TRPs is not relatively small. A UE 120 may differentiate between TRPs 605 identified in DCI based at least in part on an implicit indicator or an explicit indicator. For example, a field in the DCI (e.g., a hybrid automatic repeat request (HARQ) process identifier (ID) field) may indicate whether a grant in the DCI corresponds to the first PDSCH from the first TRP 605 or the second PDSCH from the second TRP 605.

UEs 120 can be RRC configured with a list of up to M candidate TCI states for QCL indication (where, in one example, M=64). A UE 120 may receive MAC-CE signaling to select up to $2^N$ TCI states out of the M total TCI states for PDSCH QCL indication (where, in the one example, $2^N=8$). In this case, N bits in DCI can dynamically indicate which TCI state is selected for PDSCH transmission (where, in the one example, N=3), with each possible TCI state corresponding to a reference signal (RS) set for a QCL type (e.g., a downlink RS, such as an SSB; an aperiodic, periodic, or semi-persistent CSI-RS; or a tracking reference signal (TRS), among other examples).

In Mode-1 multi-TRP transmission, for QCL indication of a DMRS for a PDSCH via DCI signaling, a TCI field in the DCI can point to two QCL relationships corresponding to two RS sets for two DMRS groups. For example, a DMRS port group 1 (corresponding to layers associated with the first TRP 605) is quasi-co-located with an RS coming from the first TRP 605 and a DMRS port group 2 (corresponding to layers associated with the second TRP 605) is quasi-co-located with an RS coming from the second TRP 605. In this case, DMRS ports for the two ports groups can be indicated via DCI. In contrast, for Mode-2 multi-TRP transmission, each DCI points to a single QCL relationship (e.g., using a TCI state field) corresponding to the layers for the single scheduled CW transmission of a single TRP 605, as described above. Accordingly, the two DCI used for two CW transmissions in Mode-2 multi-TRP transmission have two different QCL relationships corresponding to the two TRPs 605.

As indicated above, FIG. 6 is provided as an example. Other examples may differ from what is described with respect to FIG. 6.

Figure 7:
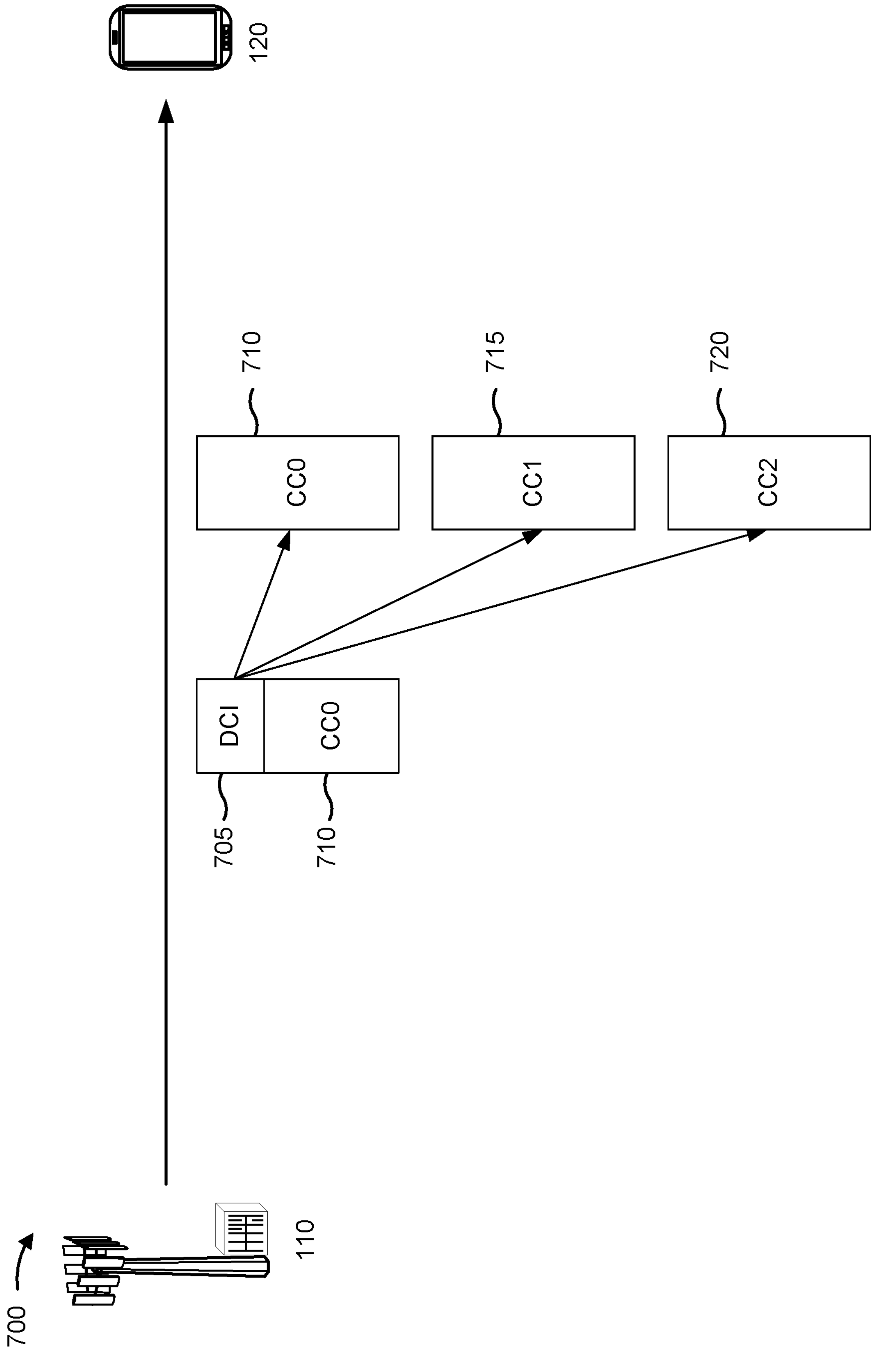
FIG. 7 is a diagram illustrating an example of downlink control information that schedules multiple cells, in accordance with the present disclosure.

FIG. 7 is a diagram illustrating an example 700 of DCI that schedules multiple cells, in accordance with the present disclosure. As shown in FIG. 7, a network node 110 and a UE 120 may communicate with one another (e.g., directly or via one or more network nodes).

The network node 110 may transmit, to the UE 120 (e.g., directly or via one or more network nodes), DCI 705 that schedules multiple communications for the UE 120. The multiple communications may be scheduled for at least two different cells. In some cases, a cell may be referred to as a carrier or a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some examples, the DCI 705 may be cross-carrier scheduling DCI, and may or may not be self-carrier scheduling DCI. In some examples, the DCI 705 that carries communications in at least two cells may be referred to as combination DCI.

In example 700, the DCI 705 schedules a communication for a first cell 710 that carries the DCI 705 (shown as CC0), schedules a communication for a second cell 715 that does not carry the DCI 705 (shown as CC1), and schedules a communication for a third cell 720 that does not carry the DCI 705 (shown as CC2). In some examples, the DCI 705 may schedule communications on a different number of cells than shown in FIG. 7 (e.g., two cells, four cells, five cells, and so on). The number of cells may be greater than or equal to two.

A communication scheduled by the DCI 705 may include a data communication, such as a PDSCH communication or a PUSCH communication. For a data communication, the DCI 705 may schedule a single transport block (TB) across multiple cells or may separately schedule multiple TBs in the multiple cells. Additionally, or alternatively, a communication scheduled by the DCI 705 may include a reference signal, such as a CSI-RS or an SRS. For a reference signal, the DCI 705 may trigger a single resource for reference signal transmission across multiple cells or may separately schedule multiple resources for reference signal transmission in the multiple cells. In some cases, scheduling information in the DCI 705 may be indicated once and reused for multiple communications (e.g., on different cells), such as an mMCS, a resource to be used for a HARQ ACK or NACK of a communication scheduled by the DCI 705, and/or a resource allocation for a scheduled communication, to conserve signaling overhead. One improvement to HARQ feedback that has been proposed is "Turbo HARQ." In Turbo HARQ an MCS value may be derived based at least in part on PDSCH decoding. XR communications can implement cross-carrier HARQ retransmission and/or Turbo HARQ to enable feedback using limited resources available to XR devices.

As indicated above, FIG. 7 is provided as an example. Other examples may differ from what is described with respect to FIG. 7.

Figure 8:
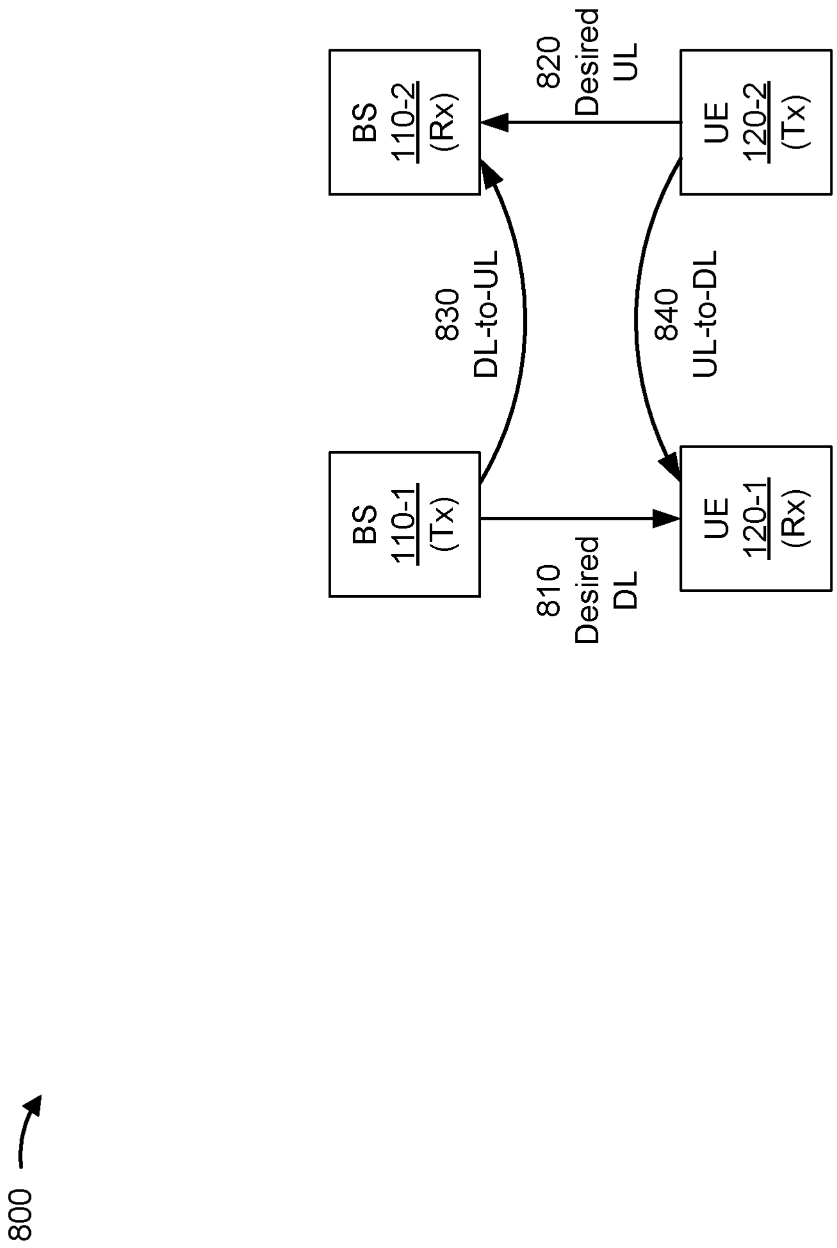
FIG. 8 is a diagram illustrating an example relating to cross-link interference detection and mitigation, in accordance with the present disclosure.

FIG. 8 is a diagram illustrating an example 800 relating to cross-link interference detection and mitigation, in accordance with the present disclosure.

In dynamic time division duplexing (TDD), the allocation of network resources to uplink and downlink may be dynamically modified depending on a traffic load. For example, a network node 110 may configure a TDD configuration (e.g., a TDD pattern) with more uplink transmission time intervals (TTIs) (e.g., frames, subframes, slots, mini-slots, and/or symbols) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the network node 110 and the UE 120.

As shown in FIG. 8, when neighboring network nodes 110 use different TDD configurations to communicate with UEs 120, this may result in a downlink communication 810 between a first network node 110-1 and a first UE 120-1 in a same TTI as an uplink communication 820 between a second network node 110-2 and a second UE 120-2. These communications in different transmission directions (e.g., downlink vs. uplink) in the same TTI may interfere with one another, which may be referred to as cross-link interference. For example, as shown by reference number 830, the downlink communication 810 transmitted by the first network node 110-1 may be received by the second network node 110-2, and may interfere with reception, by the second network node 110-2, of the uplink communication 820 from the second UE 120-2. This may be referred to as downlink-to-uplink (DL-to-UL) interference, network node to network node interference, or gNB-to-gNB interference.

Further, as shown by reference number 840, the uplink communication 820 transmitted by the second UE 120-2 may be received by the first UE 120-1, and may interfere with reception, by the first UE 120-1, of the downlink communication 810 from the first network node 110-1. This may be referred to as uplink-to-downlink (UL-to-DL) interference or UE-to-UE interference. This UE to UE interference may occur and/or may increase when the first UE 120-1 and the second UE 120-2 are in close proximity, and may be avoided or mitigated by preventing scheduling of the UEs 120 in different transmission directions in the same TTI.

In some examples, a UE 120 (e.g., the first UE 120-1 or the second UE 120-2) may observe multiple interference patterns from one or more interference sources. Each interference source and/or interference pattern may be associated with a different set of characteristics, such as a frequency domain range, a time domain range, a periodicity, an intensity, or a direction, among other examples. As an example, a first interference source may be burst interference with a first periodicity, a first temporal duration, and a first mean, variance, and/or rank, whereas a second interference source may be burst interference with a second periodicity, a second temporal duration, and a second mean, variance, and/or rank.

Some interference patterns may repeat across different interference sources. In other words, a first interference source, such as a first XR device, and a second interference source, such as a second XR device, may both cause interference with a common interference pattern, such as in connection with an operation that both interference sources perform. Additionally, or alternatively, some interference patterns may be unique to a particular interference source.

Although some examples of interference sources described herein are devices, other types of interference sources may be possible, such as objects that obstruct a signal. Such non-device interference sources may result in fixed interference (e.g., a wall) or dynamic interference (e.g., a vehicle). Additionally, or alternatively, non-device interference sources may result in pattern-based interference (e.g., a windmill, which may rotate in a fixed or otherwise deterministic manner along a fixed path, or a set of trains, which may move according to a periodic schedule along a fixed path, thereby resulting in a pattern of interference associated with the schedule).

As indicated above, FIG. 8 is provided as an example. Other examples are possible and may differ from what was described with respect to FIG. 8.

In increasingly dense communications systems, interference may affect a reliability of communications between different devices. For example, a UE may experience interference when communicating with one or more other devices. Interference may be a particular problem for some types of communications, such as XR communications, URLLC, or sidelink communications, among other examples, that may have low reliability when interference occurs. For example, some communications may have relatively low signal strengths, be used in particularly dense wireless networks (e.g., wireless networks with large quantities of devices), rely on contention-based access resources or an unlicensed spectrum, or use limited resources that reduce redundancy, among other examples.

A network node may provide interference management assistance to devices in a wireless network. For example, a network node may schedule resources, alter communication configurations, or provide information identifying reported interference sources to UEs or XR devices to enable interference avoidance or mitigation. Interference reporting may include information regarding identified interference during a particular period of time, which may result in static control of interference avoidance or mitigation techniques. However, some interference sources may be periodic, resulting in the interference reporting failing to account for recurrences of interference, which may result in inadequate interference avoidance or mitigation and poor communication reliability.

Some aspects described herein may enable a UE to provide interference reporting associated with a set of different interference sources, and a network node may characterize the set of interference sources and/or a set of interference patterns associated therewith. In this way, the network node can control interference avoidance or mitigation techniques more accurately, which improves reliability of communications in, for example, XR, URLLC, or sidelink communications deployments. In some of the above-mentioned deployments, there may be multiple TRPs communications with which are scheduled using, for example, one or more DCI messages. In this case, a UE may be configured to transmit CSI reporting for a multi-TRP deployment based at least in part on a characteristic of the DCI. In this way, the UE can provide reporting regarding observed channel conditions, which can be used for, for example, configuring interference avoidance or mitigation techniques.

Figure 9:
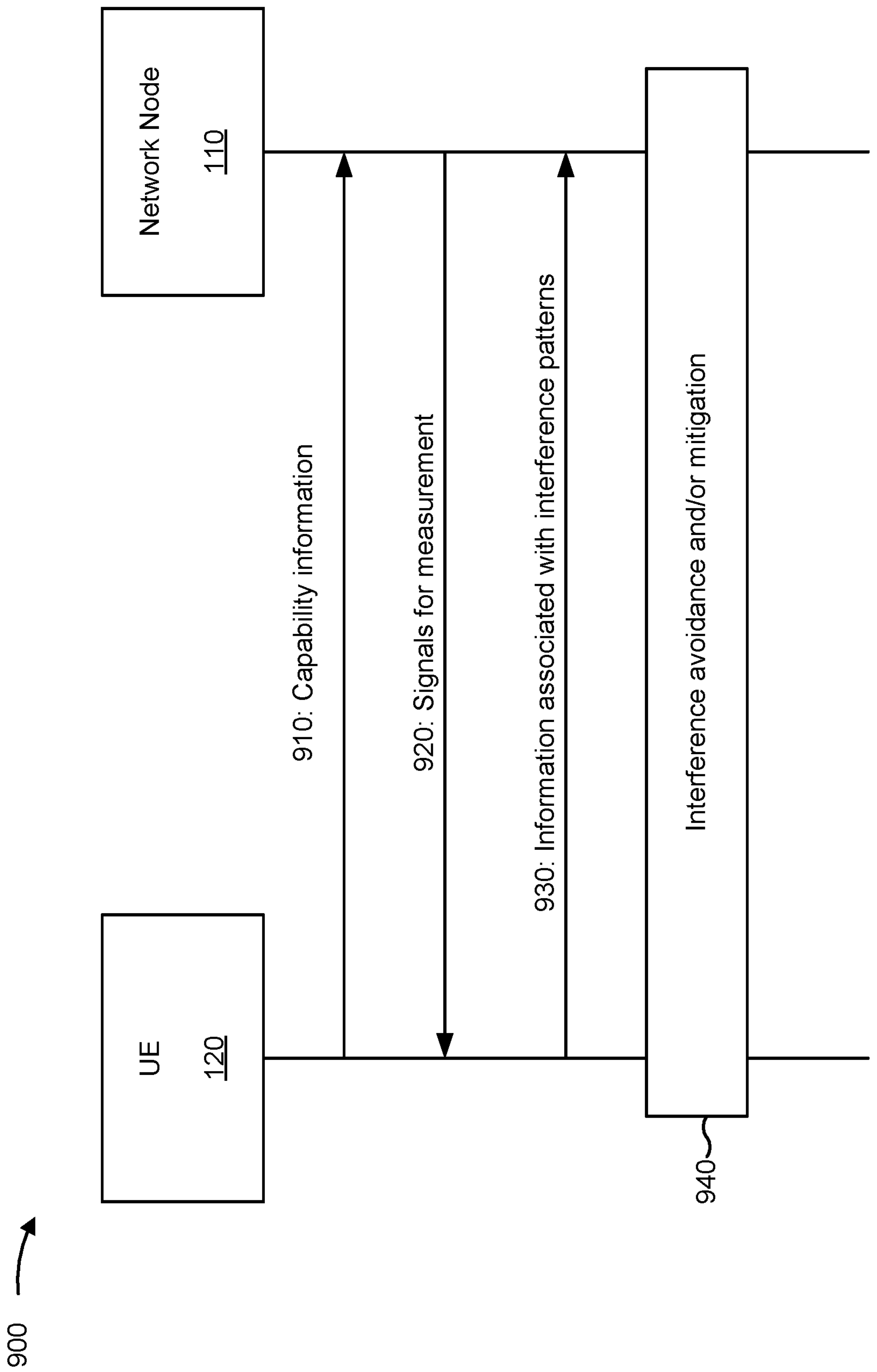
FIG. 9 is a diagram illustrating an example associated with interference characterization for channel metric reporting, in accordance with the present disclosure.

FIG. 9 is a diagram illustrating an example 900 associated with interference characterization for channel metric reporting, in accordance with the present disclosure. As shown in FIG. 9, example 900 includes communication between a network node 110 and a UE 120.

As further shown in FIG. 9, and by reference number 910, the UE 120 may transmit capability information to the network node 110. For example, the UE 120 may indicate that the UE 120 is capable of identifying a set of interference patterns. In some aspects, the capability information may relate to a processing capability of the UE 120. For example, the UE 120 may indicate that the UE 120 is capable of using a recurrent neural network (RNN) to estimate an interference pattern based at least in part on a measurement of a DMRS. Additionally, or alternatively, the UE 120 may indicate a quantity of interference patterns that the UE 120 is capable of tracking. For example, based at least in part on a memory capacity of the UE 120, the UE 120 may indicate a capability of tracking a particular quantity of interference patterns. In some aspects, the UE 120 may receive configuration information as a response to the capability information. For example, the network node 110 may configure the UE 120 with resources for measuring interference or with a set of interference patterns to track, among other examples.

An interference pattern may include interference that has a particular set of characteristics distinguishable from other interference. For example, an interference pattern may have a time characteristic that differs from other observed interference, such as a time-domain pattern, a slot based pattern, a sub-slot based pattern, or another periodicity-based pattern. Additionally, or alternatively, an interference pattern may include another characteristic, such as a frequency domain pattern, a bandwidth of interference, or a spatial domain pattern (e.g., a particular beam or rank), among other examples. As one example, the UE 120 may have a capability of identifying a cross-link interference pattern in which a nearby cell (e.g., near to a cell being used by the UE 120) is associated with a different time domain duplexing pattern, resulting in periodic interference. Similarly, if an aggressor UE (e.g., that causes interference at the UE 120) is using configured grants, the UE 120 may observe periodic interference corresponding to a time and frequency allocation of the aggressor UE's configured grants. For example, in an XR traffic use case, XR devices may have configured grants with fixed power, rank, MCS, and/or time and frequency allocation, resulting in a pattern of interference at the UE 120 that the UE 120 can distinguish from other configured grants at other XR devices. Similarly, the UE 120 may identify semi-persistent scheduling patterns resulting in interference at the UE 120.

In some aspects, the UE 120 or the network node 110 may identify an interference pattern based at least in part on one or more characteristics. For example, the UE 120 may cross-correlate a per resource block or per symbol RSRP to determine if the RSRP exceeds a threshold for a particular period or set of periods. The UE 120 may characterize spatial domain interference using an RNN technique and/or using corresponding eigen spaces or eigen values or ranks. In some aspects, when the UE 120 is to use an RNN or other model-based technique, the UE 120 may have a training phase in which the UE 120 trains a model to identify different interference patterns. In this case, the network node 110 may configure specific CSI interference measurement (CSI-IM) resources based at least in part on observed interference patterns and/or recommendations during the training phase.

As further shown in FIG. 9, and by reference number 920, the UE 120 may receive, from the network node 110, one or more signals for measurement. For example, the UE 120 may receive a set of reference signals, such as a DMRS or a CSI-RS, among other examples. In some aspects, the network node 110 may configure the one or more signals to enable the UE 120 to perform measurements of interference. For example, the network node 110 may puncture a DMRS to enable the UE 120 to perform an interference measurement. Additionally, or alternatively, the network node 110 may configure the CSI-RSs as CSI-IM resources on which the UE 120 can measure interference.

As further shown in FIG. 9, and by reference number 930, the UE 120 may transmit information, associated with a set of interference patterns, to the network node 110. For example, the UE 120 may transmit information identifying an interference pattern. Additionally, or alternatively, the UE 120 may transmit information identifying a set of measurements, from which the network node 110 may determine an interference pattern.

In some aspects, the UE 120 may determine an interference pattern using a DMRS. For example, when the UE 120 receives a DMRS, the UE 120 may use an RNN estimation technique based at least in part on the DMRS to identify an interference pattern. In this case, the network node 110 may configure a set of DMRS PDSCH transmissions, and the network node 110 may configure puncturing of the set of DMRS PDSCH transmissions to enable interference measurement by the UE 120. Additionally, or alternatively, the UE 120 may determine an interference pattern based at least in part on a CSI-RS. For example, the UE 120 may receive CSI-IM resources, the UE 120 may perform a set of interference measurements on the CSI-IM resources, and the UE 120 may determine an interference pattern based at least in part on the set of interference measurements. In this case, the network node 110 may configure the CSI-IM resources with a relatively high time and/or frequency density and/or may time division multiplex the CSI-IM resources across a plurality of occasions.

In some aspects, the UE 120 may transmit a report of the set of interference patterns based at least in part on configuration information received from the network node 110. For example, the network node 110 may transmit a request for time domain information and/or frequency domain information for a set of interference patterns. In this case, the network node 110 may transmit information including a set of index values for the set of interference patterns. For example, the network node 110 and the UE 120 may be configured with a table of identifiers of a set of interference patterns and/or sources and the network node 110 may transmit information identifying a set of index values corresponding to interference patterns and/or sources in the table of identifiers. In this case, the UE 120 may, when reporting information regarding the set of interference patterns, include information identifying active interference patterns and/or sources at a reporting time (by including index values in a reporting of interference patterns or channel metrics).

In some aspects, information included in the report of the set of interference patterns is based at least in part on configuration information. For example, the network node 110 may identify one or more requested parameters for including in the report, and the UE 120 may include the one or more requested parameters based at least in part on the network node 110 configuring the UE 120. In this case, the one or more requested parameters may include a pattern time, a pattern frequency, a predicted or expected on duration, a rank, or a power associated with an interference pattern or source. Additionally, or alternatively, the UE 120 may include information indicating how long is remaining in an interference pattern (e.g., based at least in part on an expected duration) or information identifying a next predicted interference pattern (e.g., based at least in part on previous observations of periodic interference patterns) and/or a predicted change to metrics associated with the next predicted interference pattern. Additionally, or alternatively, the UE 120 may include information indicating a start of a current interference pattern (e.g., a quantity of slots k since a start of the current interference pattern at a slot n). In this case, the network node 110 may use time parameters associated with the current interference pattern to determine an amount of time remaining in the interference pattern and/or a next predicted interference pattern. In some aspects, the UE 120 may report a most recent one or more interference patterns observed within an observation window (e.g., a particular quantity, x, of symbols, slots, or other time units). In some aspects, the observation window may be from a previous reporting instance.

In some aspects, the UE 120 may transmit a report of the set of interference patterns based at least in part on detecting a change in interference measurements. For example, the UE 120 may detect that an interference pattern is deactivated (e.g., the UE 120 does not observe an interference pattern that was previously observed, such as based at least in part on a device generating the interference pattern being deactivated). In this case, the UE 120 may transmit a report to indicate that the interference pattern has been deactivated. In contrast, the UE 120 may detect a new interference pattern and report the new interference pattern to network node 110. The network node 110 may store information indicating that the interference pattern is, for example, deactivated and, for example, may omit an identifier of the interference pattern from subsequent requests for reporting. Further, the network node 110 may schedule communications using resources associated with the interference pattern based at least in part on receiving information indicating that the interference pattern is deactivated.

In some aspects, the UE 120 may transmit a report of the set of interference patterns using allocated resources. For example, the network node 110 may allocate uplink resources to the UE 120 with a particular periodicity for periodically reporting information regarding the set of interference patterns. In this case, the network node 110 may configure the set of uplink resources using, for example, RRC signaling and may update a configuration of the set of uplink resources using, for example, MAC-CE signaling.

Additionally, or alternatively, the UE 120 may receive an explicit indicator from the network node (e.g., in DCI) indicating that the UE 120 is to report the set of interference patterns using allocated resources (e.g., allocated in the DCI). For example, the network node 110 may transmit single-stage DCI identifying a set of resources and indicate that the UE 120 is to perform interference pattern reporting using the set of resources. Additionally, or alternatively, the UE 120 may receive multi-stage DCI. In this case, in a first stage, the network node 110 may indicate a downlink orthogonal frequency division multiplexing (OFDM) symbol or resource block allocation, a time domain resource allocation (TDRA), a frequency domain resource allocation (FDRA), or a set of possible MCSs, among other examples. The UE 120 may transmit a response, based at least in part on which interference patterns are to be activated at a time of a scheduled PDSCH, indicating whether to use one of the identified set of possible MCSs or a different MCS. The network node 110 may transmit a second-stage DCI that includes a confirmation of a final MCS, FDRA, or TDRA, among other examples for transmitting interference reporting. Additionally, or alternatively, the UE 120 may receive information identifying potential TDRA or resource block (RB) allocations and the UE 120 may respond with a selected allocation based at least in part on an observed interference pattern. Additionally, or alternatively, the network node 110 may request information regarding a current interference pattern, power, or rank and may transmit a response indicating an allocation or other control information.

Additionally, or alternatively, the UE 120 may use resources allocated for another report to identify the set of interference patterns. For example, the UE 120 may transmit information identifying the set of interference patterns using a CSI report. In this case, in a CSI report configuration, the network node 110 may include a set of indices or labels of a set of interference patterns or sources regarding which the network node 110 requests the UE 120 provide reporting. The UE 120 may transmit CSI reporting with information identifying characteristics regarding the set of interference patterns or sources based at least in part on the CSI report configuration.

As further shown in FIG. 9, and by reference number 940, the UE 120 and the network node 110 may implement one or more interference avoidance and/or mitigation actions. For example, the network node 110 may schedule communications on one or more resources for which there is no predicted interference based at least in part on identifying the set of interference patterns or sources. Additionally, or alternatively, the network node 110 may configure the UE 120 with a set of parameters for communication (e.g., with the network node 110, with another UE 120, or with an XR device 170, among other examples) to reduce or mitigate an impact of interference that may be present on one or more communication resources.

As indicated above, FIG. 9 is provided as an example. Other examples may differ from what is described with respect to FIG. 9.

Figure 10:
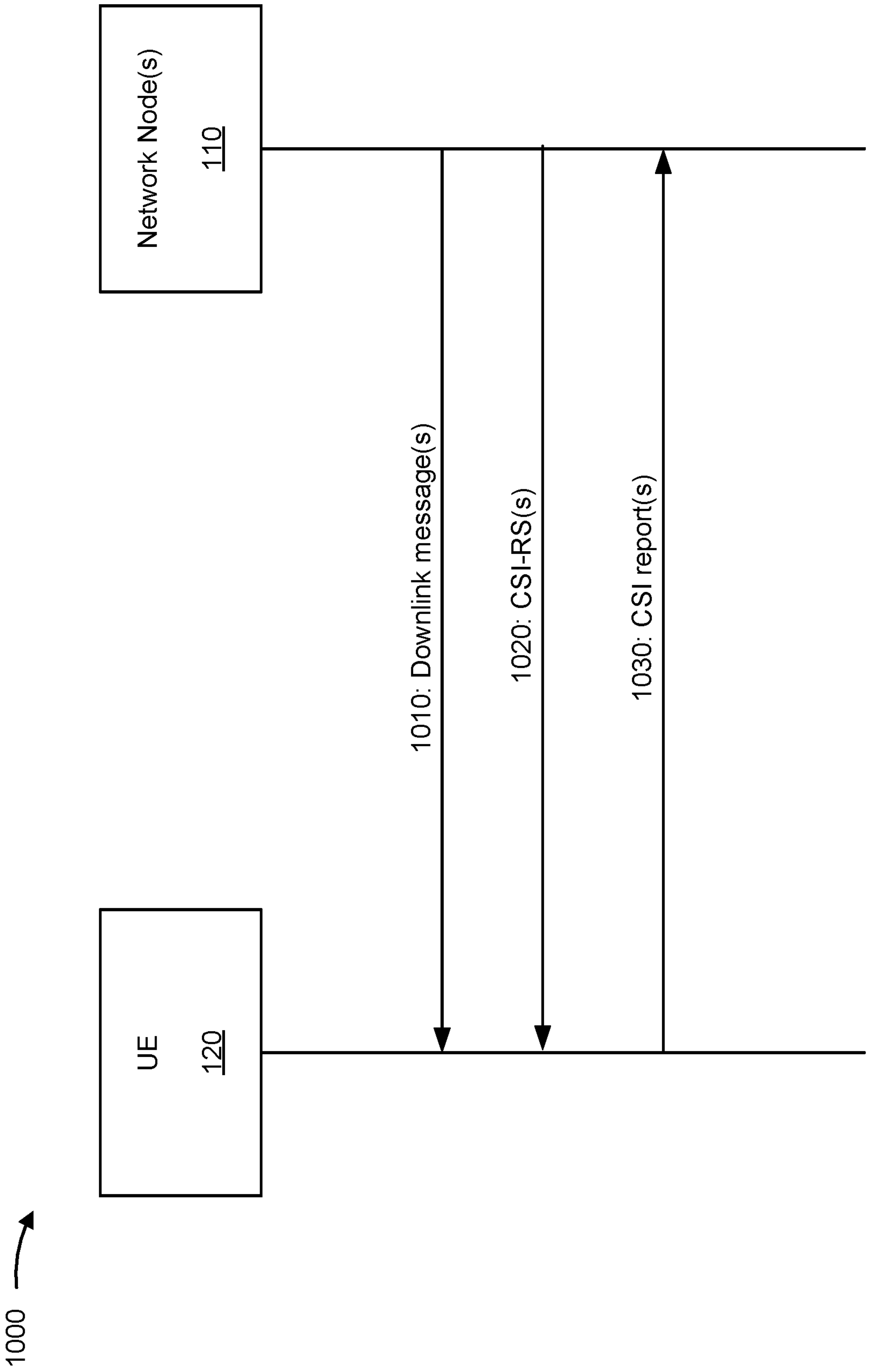
FIG. 10 is a diagram illustrating an example associated with channel state information report configuration for channel metric reporting, in accordance with the present disclosure.

FIG. 10 is a diagram illustrating an example 1000 associated with channel state information report configuration for channel metric reporting, in accordance with the present disclosure. As shown in FIG. 10, example 1000 includes communication between one or more network nodes 110 and a UE 120.

As further shown in FIG. 10, and by reference number 1010, the UE 120 may receive a set of downlink messages from the one or more network nodes 110. For example, the UE 120 may receive a single DCI associated with scheduling communications with a first network node 110 and a second network node 110. Additionally, or alternatively, the UE 120 may receive a plurality of DCI messages associated with scheduling communications. For example, the UE 120 may receive a first DCI scheduling communications with a first network node 110 and a second DCI scheduling communications with a second network node 110.

As further shown in FIG. 10, and by reference numbers 1020 and 1030, the UE 120 may receive a set of CSI-RSs and transmit a set of CSI reports. For example, the UE 120 may generate one or more CSI reports and transmit the one or more CSI reports to one or more network nodes 110. In some aspects, the UE 120 may transmit a single CSI report that conveys information associated with a plurality of CSI-RSs. For example, the UE 120 may combine two CSI reports into a single transmission of a CSI report. Additionally, or alternatively, the UE 120 may generate a plurality of CSI reports corresponding to the plurality of CSI-RSs.

In some aspects, the UE 120 may determine a quantity of CSI-RS reports to transmit based at least in part on a quantity of received DCI scheduling CSI-RSs. For example, when the UE 120 receives a single DCI scheduling CSI-RSs from a first TRP and a second TRP, the UE 120 may transmit a single CSI report reporting information from the CSI-RSs. In contrast, when the UE 120 receives a first DCI scheduling a first CSI-RS from a first TRP and a second DCI scheduling a second CSI-RS from a second TRP, the UE 120 may transmit a first CSI report to the first TRP and a second CSI report to the second TRP.

Additionally, or alternatively, the UE 120 may determine a type of CSI-RS report (e.g., a single, compressed CSI report or a plurality of CSI reports) based at least in part on a control resource set (CORESET). For example, the UE 120 may associate a first type of CORESET or search space with a first type of CSI report and a second type of CORSET or search space with a second type of CSI report. Additionally, or alternatively, the UE 120 may determine the quantity of CSI reports based at least in part on a quantity of CWs. For example, when a first TRP and a second TRP transmit different layers of a single CW, the UE 120 may transmit a single CSI report. In contrast, when the first TRP and the second TRP transmit different CWs, the UE 120 may transmit different CSI reports for the different CWs.

Additionally, or alternatively, the UE 120 may determine a quantity of CSI reports based at least in part on a quantity of TCI states. For example, when a TCI state for each CSI report is the same, the UE 120 may compress each CSI report into a single CSI report. In contrast, when a first CSI-RS and associated CSI report corresponds to a first TCI state and a second CSI-RS and associated CSI report corresponds to a second TCI state, the UE 120 may transmit a first CSI report for the first TCI state and a second CSI report for the second TCI state. Additionally, or alternatively, the UE 120 may determine a quantity of CSI reports based at least in part on a transmission mode. For example, the network node 110 may configure the UE 120 to transmit a compressed CSI report for spatial division multiplexing of CSI-RSs and separate CSI reports for time division multiplexing or frequency division multiplexing of CSI-RSs. In some aspects, the UE 120 may receive an explicit indicator of a quantity of CSI reports to transmit. For example, the network node 110 may transmit DCI signaling, RRC signaling, or MAC-CE signaling indicating a quantity of CSI-RSs that the UE 120 is to transmit as a response to received CSI-RSs.

In one example, the UE 120 may be configured with different modes (e.g., via received signaling from the network node 110). For example, the UE 120 may be configured with a first mode for frequency division multiplexing or time division multiplexing with frequency hopping. In the first mode, the UE 120 may transmit a single CSI report in which the UE 120 determines a full allocation (e.g., a set of sub-bands based at least in part on a total quantity of allocated resource blocks) as a single band. In this case, the UE 120 performs CSI reporting, including dividing the band into the set of sub-bands, and differential CQI reporting using a single CSI report. In contrast, the UE 120 may be configured with a multi-CSI report mode in which the UE 120 transmits two separate CSI reports for different sub-bands. In some aspects, a first CSI report, of the two separate CSI reports, is a complete CSI report and a second CSI report is a differential CSI report. In this case, rather than indicate a metric associated with the CSI-RS explicitly, the differential CSI report includes an indicator identifying an offset. In other words, a second metric of a second CSI-RS is identified based at least in part on a difference between the second metric and a first metric of a first CSI-RS. In another example, in which the UE 120 is configured for time division multiplexing with the same frequency (rather than frequency hopping), the UE 120 may be configured to send CSI reporting for each TRP separately, send full CSI reporting and differential CSI reporting for two TRPs, or send only information identifying a worst CSI (e.g., a CSI-RS with a worst channel quality metric).

In some aspects, the UE 120 may transmit CSI reporting that includes a repetition indicator. For example, when the CSI is associated with low-density parity check (LDPC) iterations, the UE 120 may include an LDPC iteration request (for retransmission) for a first TRP transmission in a first CSI report and a second LDPC iteration request for a second TRP transmission in a second CSI report. In some aspects, the UE 120 may indicate a best redundancy version (RV) index for each TRP that has transmitted a CSI-RS. For example, for two CSI-RSs associated with the same transport block, the UE 120 may report an RV index for a first CSI-RS and a differential value (e.g., a bit offset) for a second RV index for a second CSI-RS. Additionally, or alternatively, the UE 120 may transmit a single RV index for both CSI-RSs (e.g., when the CSI-RSs are associated with the same CSI report).

As indicated above, FIG. 10 is provided as an example. Other examples may differ from what is described with respect to FIG. 10.

Figure 11:
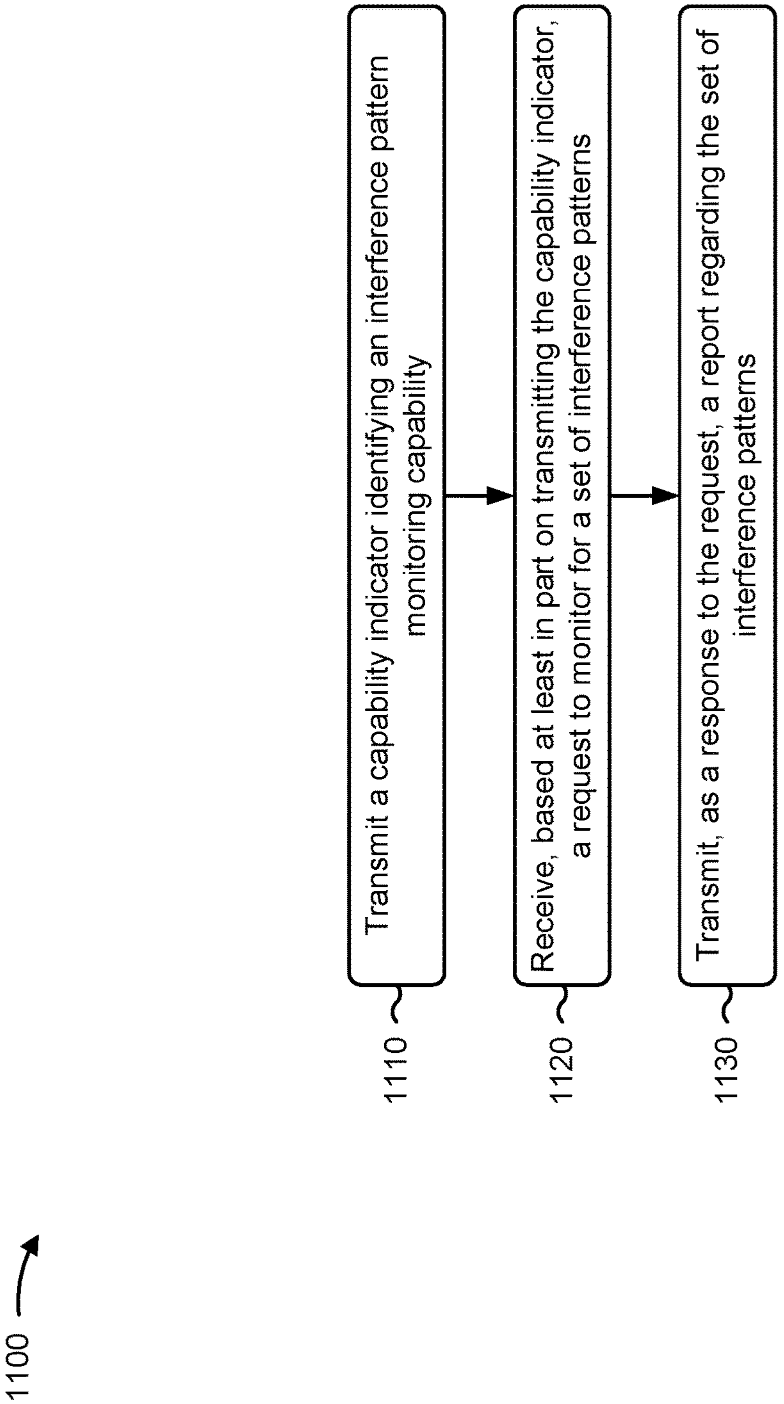
FIGS. 11 and 12 are diagrams illustrating example processes performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with channel metric reporting.

As shown in FIG. 11, in some aspects, process 1100 may include transmitting a capability indicator identifying an interference pattern monitoring capability (block 1110). For example, the UE (e.g., using transmission component 1504 and/or communication manager 1506, depicted in FIG. 15) may transmit a capability indicator identifying an interference pattern monitoring capability, as described above.

As further shown in FIG. 11, in some aspects, process 1100 may include receiving, based at least in part on transmitting the capability indicator, a request to monitor for a set of interference patterns (block 1120). For example, the UE (e.g., using reception component 1502 and/or communication manager 1506, depicted in FIG. 15) may receive, based at least in part on transmitting the capability indicator, a request to monitor for a set of interference patterns, as described above.

As further shown in FIG. 11, in some aspects, process 1100 may include transmitting, as a response to the request, a report regarding the set of interference patterns (block 1130). For example, the UE (e.g., using transmission component 1504 and/or communication manager 1506, depicted in FIG. 15) may transmit, as a response to the request, a report regarding the set of interference patterns, as described above.

Process 1100 may include additional aspects, such as any single aspect or any combination of aspects described below and/or in connection with one or more other processes described elsewhere herein.

In a first aspect, the interference pattern monitoring capability includes a maximum quantity of interference patterns for monitoring or tracking.

In a second aspect, alone or in combination with the first aspect, the interference pattern monitoring capability is specific to one or more bandwidth parts or carriers.

In a third aspect, alone or in combination with one or more of the first and second aspects, the request to monitor for the set of interference patterns includes a request to identify a pattern or a source of the set of interference patterns.

In a fourth aspect, alone or in combination with one or more of the first through third aspects, process 1100 includes determining the set of interference patterns based at least in part on at least one of a demodulation reference signal, an interference metric, or a noise metric.

In a fifth aspect, alone or in combination with one or more of the first through fourth aspects, process 1100 includes receiving a communication configuration associated with configuring demodulation reference signal or physical downlink shared channel puncturing, and determining the set of interference patterns based at least in part on the demodulation reference signal or physical downlink shared channel puncturing.

In a sixth aspect, alone or in combination with one or more of the first through fifth aspects, process 1100 includes requesting configuration of a channel state information interference measurement resource, receiving a communication configuration associated with configuring the channel state information interference measurement resource, and determining the set of interference patterns based at least in part on the channel state information interference measurement resource.

In a seventh aspect, alone or in combination with one or more of the first through sixth aspects, process 1100 includes mapping a set of identifiers to the set of interference patterns, and identifying one or more interference patterns, of the set of interference patterns, in one or more communications using a corresponding one or more identifiers, of the set of identifiers.

In an eighth aspect, alone or in combination with one or more of the first through seventh aspects, the report includes information identifying at least one of an identifier mapped to an interference pattern of the set of interference patterns, an interference duration, an interference frequency, a predicted on duration, a rank, an interference power, a predicted end to the interference pattern, a predicted next interference pattern of the set of interference patterns, or a previously observed interference pattern of the set of interference patterns.

In a ninth aspect, alone or in combination with one or more of the first through eighth aspects, process 1100 includes receiving information identifying a resource for identifying an update to the set of interference patterns, the resource being a periodic resource or a dynamically configured resource, and transmitting information identifying the update to the set of interference patterns using the resource.

In a tenth aspect, alone or in combination with one or more of the first through ninth aspects, the report is included in a channel state information configuration report.

In an eleventh aspect, alone or in combination with one or more of the first through tenth aspects, process 1100 includes receiving downlink control information identifying communication configuration information, the downlink control information being based at least in part on the report.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
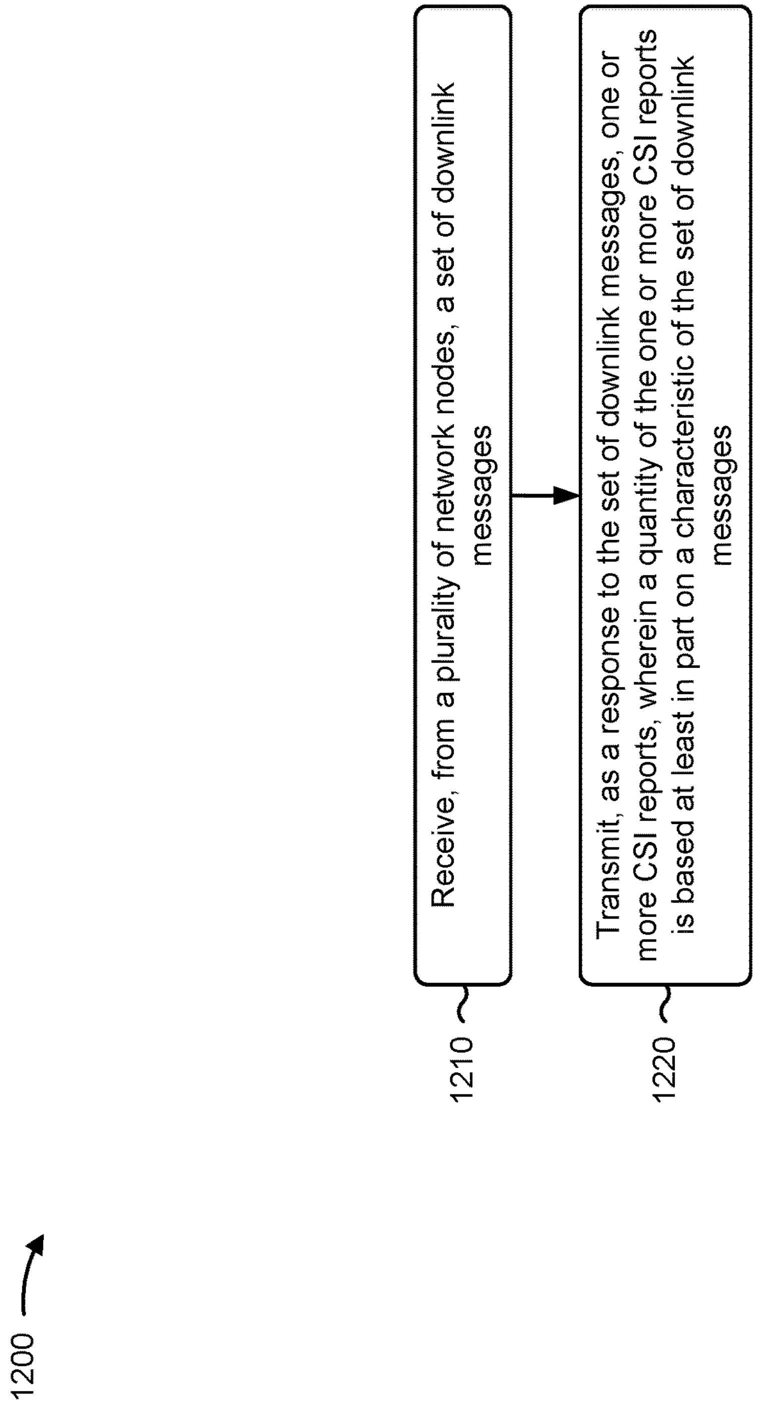

FIG. 12 is a diagram illustrating an example process 1200 performed, for example, by a UE, in accordance with the present disclosure. Example process 1200 is an example where the UE (e.g., UE 120) performs operations associated with channel metric reporting.

As shown in FIG. 12, in some aspects, process 1200 may include receiving, from a plurality of network nodes, a set of downlink messages (block 1210). For example, the UE (e.g., using reception component 1502 and/or communication manager 1506, depicted in FIG. 15) may receive, from a plurality of network nodes, a set of downlink messages, as described above.

As further shown in FIG. 12, in some aspects, process 1200 may include transmitting, as a response to the set of downlink messages, one or more CSI reports, wherein a quantity of the one or more CSI reports is based at least in part on a characteristic of the set of downlink messages (block 1220). For example, the UE (e.g., using transmission component 1504 and/or communication manager 1506, depicted in FIG. 15) may transmit, as a response to the set of downlink messages, one or more CSI reports, wherein a quantity of the one or more CSI reports is based at least in part on a characteristic of the set of downlink messages, as described above.

Process 1200 may include additional aspects, such as any single aspect or any combination of aspects described below and/or in connection with one or more other processes described elsewhere herein.

In a first aspect, the one or more CSI reports include a single compressed CSI report or a plurality of non-compressed CSI reports.

In a second aspect, alone or in combination with the first aspect, the quantity of CSI reports is based at least in part on a quantity of downlink messages in the set of downlink messages.

In a third aspect, alone or in combination with one or more of the first and second aspects, the quantity of CSI reports is based at least in part on at least one of a control resource set, a search space, a quantity of codewords, a quantity of transmission configuration indicator states, a transmission mode, an explicit indication from at least one network node of the plurality of network nodes, whether frequency hopping is enabled, or a type of multiplexing that is enabled.

In a fourth aspect, alone or in combination with one or more of the first through third aspects, the one or more CSI reports are associated with one or more low-density parity check iterations.

In a fifth aspect, alone or in combination with one or more of the first through fourth aspects, the one or more CSI reports include one or more repetition indicators for the plurality of network nodes or one or more redundancy version indicators for the plurality of network nodes.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
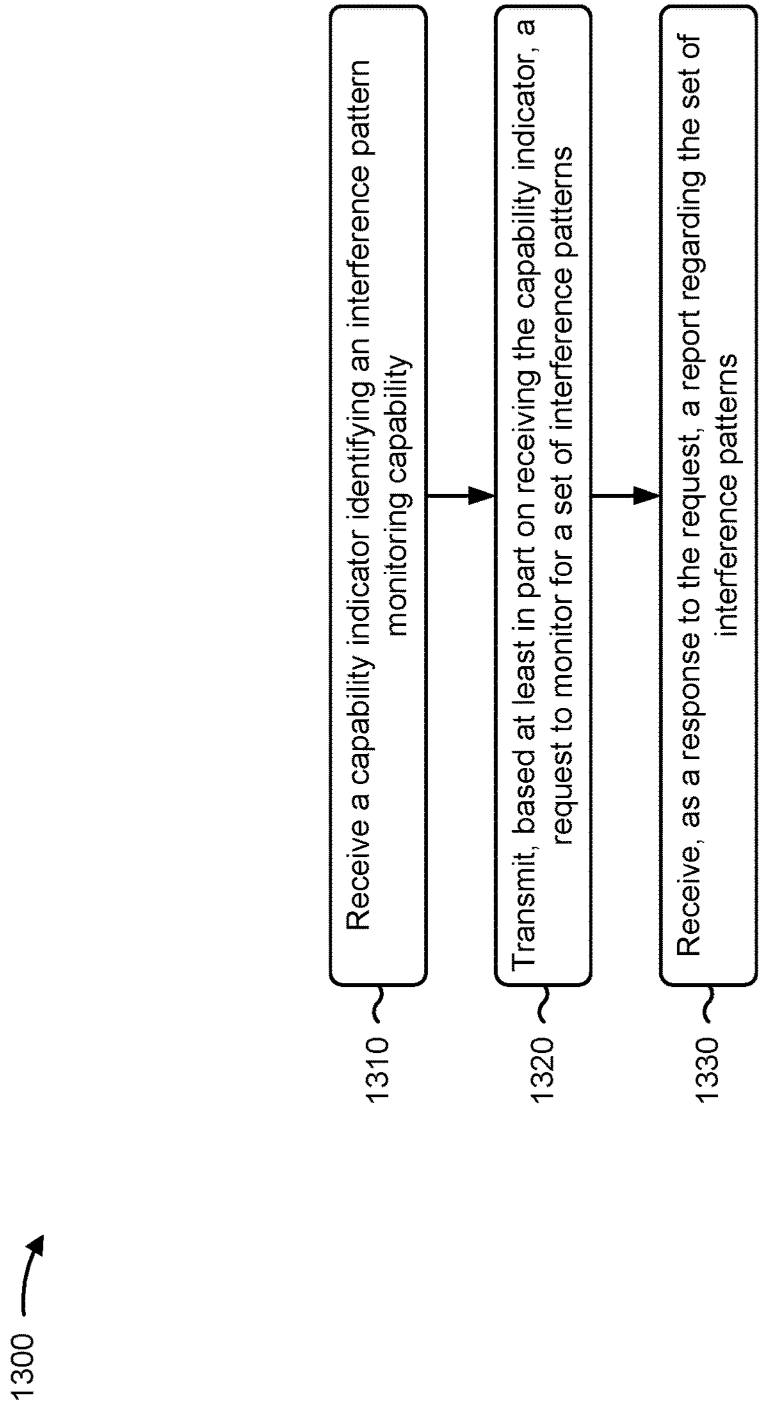
FIGS. 13 and 14 are diagrams illustrating example processes performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with channel metric reporting.

As shown in FIG. 13, in some aspects, process 1300 may include receiving a capability indicator identifying an interference pattern monitoring capability (block 1310). For example, the network node (e.g., using reception component 1602 and/or communication manager 1606, depicted in FIG. 16) may receive a capability indicator identifying an interference pattern monitoring capability, as described above.

As further shown in FIG. 13, in some aspects, process 1300 may include transmitting, based at least in part on receiving the capability indicator, a request to monitor for a set of interference patterns (block 1320). For example, the network node (e.g., using transmission component 1604 and/or communication manager 1606, depicted in FIG. 16) may transmit, based at least in part on receiving the capability indicator, a request to monitor for a set of interference patterns, as described above.

As further shown in FIG. 13, in some aspects, process 1300 may include receiving, as a response to the request, a report regarding the set of interference patterns (block 1330). For example, the network node (e.g., using reception component 1602 and/or communication manager 1606, depicted in FIG. 16) may receive, as a response to the request, a report regarding the set of interference patterns, as described above.

Process 1300 may include additional aspects, such as any single aspect or any combination of aspects described below and/or in connection with one or more other processes described elsewhere herein.

In a first aspect, the interference pattern monitoring capability includes a maximum quantity of interference patterns for monitoring or tracking.

In a second aspect, alone or in combination with the first aspect, the interference pattern monitoring capability is specific to one or more bandwidth parts or carriers.

In a third aspect, alone or in combination with one or more of the first and second aspects, the request to monitor for the set of interference patterns includes a request to identify a pattern or a source of the set of interference patterns.

In a fourth aspect, alone or in combination with one or more of the first through third aspects, the set of interference patters is based at least in part on at least one of a demodulation reference signal, an interference metric, or a noise metric.

In a fifth aspect, alone or in combination with one or more of the first through fourth aspects, process 1300 includes transmitting a communication configuration associated with configuring demodulation reference signal or physical downlink shared channel puncturing.

In a sixth aspect, alone or in combination with one or more of the first through fifth aspects, process 1300 includes receiving a request for configuration of a channel state information interference measurement resource, transmitting a communication configuration associated with configuring the channel state information interference measurement resource.

In a seventh aspect, alone or in combination with one or more of the first through sixth aspects, a set of identifiers map to the set of interference patterns.

In an eighth aspect, alone or in combination with one or more of the first through seventh aspects, the report includes information identifying at least one of an identifier mapped to an interference pattern of the set of interference patterns, an interference duration, an interference frequency, a predicted on duration, a rank, an interference power, a predicted end to the interference pattern, a predicted next interference pattern of the set of interference patterns, or a previously observed interference pattern of the set of interference patterns.

In a ninth aspect, alone or in combination with one or more of the first through eighth aspects, process 1300 includes transmitting information identifying a resource for identifying an update to the set of interference patterns, the resource being a periodic resource or a dynamically configured resource, and receiving information identifying the update to the set of interference patterns using the resource.

In a tenth aspect, alone or in combination with one or more of the first through ninth aspects, the report is included in a channel state information configuration report.

In an eleventh aspect, alone or in combination with one or more of the first through tenth aspects, process 1300 includes transmitting downlink control information identifying communication configuration information, the downlink control information being based at least in part on the report.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
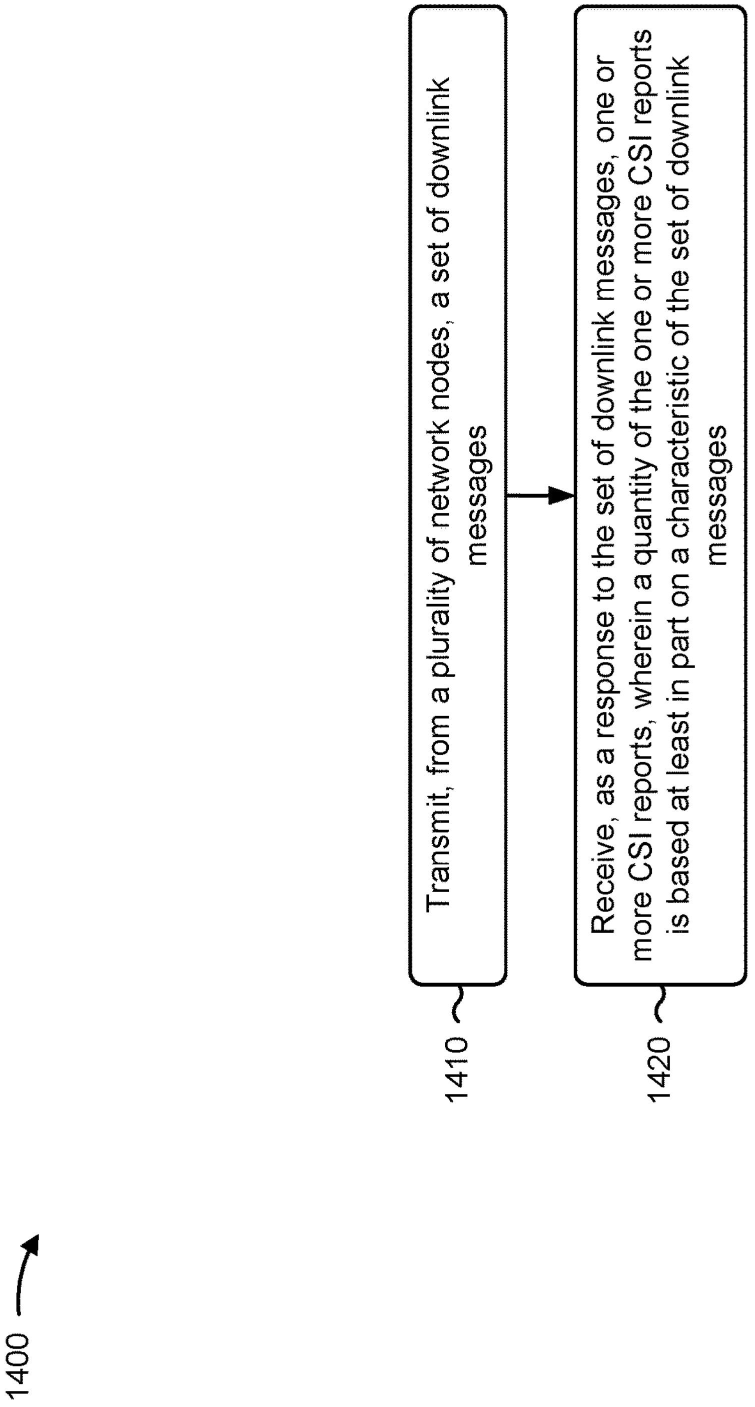

FIG. 14 is a diagram illustrating an example process 1400 performed, for example, by a network node, in accordance with the present disclosure. Example process 1400 is an example where the network node (e.g., network node 110) performs operations associated with channel metric reporting.

As shown in FIG. 14, in some aspects, process 1400 may include transmitting, from a plurality of network nodes, a set of downlink messages (block 1410). For example, the network node (e.g., using transmission component 1604 and/or communication manager 1606, depicted in FIG. 16) may transmit, from a plurality of network nodes, a set of downlink messages, as described above.

As further shown in FIG. 14, in some aspects, process 1400 may include receiving, as a response to the set of downlink messages, one or more CSI reports, wherein a quantity of the one or more CSI reports is based at least in part on a characteristic of the set of downlink messages (block 1420). For example, the network node (e.g., using reception component 1602 and/or communication manager 1606, depicted in FIG. 16) may receive, as a response to the set of downlink messages, one or more CSI reports, wherein a quantity of the one or more CSI reports is based at least in part on a characteristic of the set of downlink messages, as described above.

Process 1400 may include additional aspects, such as any single aspect or any combination of aspects described below and/or in connection with one or more other processes described elsewhere herein.

In a first aspect, the one or more CSI reports include a single compressed CSI report or a plurality of non-compressed CSI reports.

In a second aspect, alone or in combination with the first aspect, the quantity of CSI reports is based at least in part on a quantity of downlink messages in the set of downlink messages.

In a third aspect, alone or in combination with one or more of the first and second aspects, the quantity of CSI reports is based at least in part on at least one of a control resource set, a search space, a quantity of codewords, a quantity of transmission configuration indicator states, a transmission mode, an explicit indication from at least one network node of the plurality of network nodes, whether frequency hopping is enabled, or a type of multiplexing that is enabled.

In a fourth aspect, alone or in combination with one or more of the first through third aspects, the one or more CSI reports are associated with one or more low-density parity check iterations.

In a fifth aspect, alone or in combination with one or more of the first through fourth aspects, the one or more CSI reports include one or more repetition indicators for the plurality of network nodes or one or more redundancy version indicators for the plurality of network nodes.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
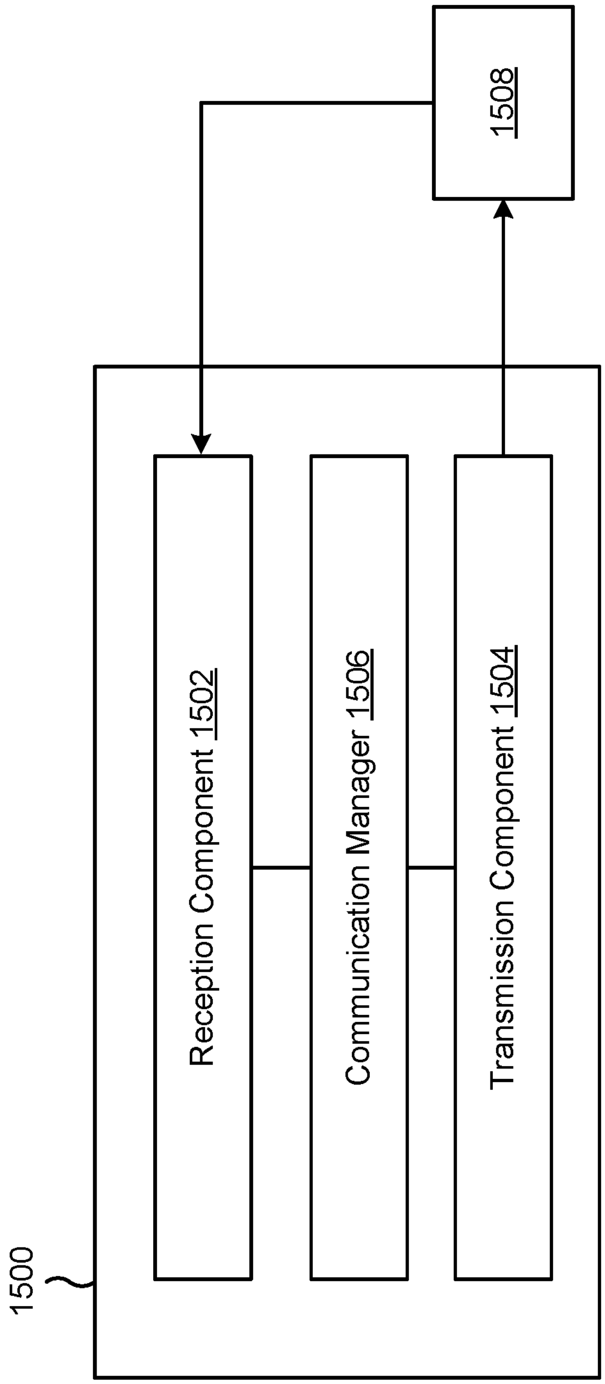
FIGS. 15 and 16 are diagrams of example apparatuses for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 140 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 9-10. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The transmission component 1504 may transmit a capability indicator identifying an interference pattern monitoring capability. The reception component 1502 may receive, based at least in part on transmitting the capability indicator, a request to monitor for a set of interference patterns. The transmission component 1504 may transmit, as a response to the request, a report regarding the set of interference patterns.

The communication manager 1506 may determine the set of interference patterns based at least in part on at least one of a demodulation reference signal, an interference metric, or a noise metric. The reception component 1502 may receive a communication configuration associated with configuring demodulation reference signal or physical downlink shared channel puncturing. The communication manager 1506 may determine the set of interference patterns based at least in part on the demodulation reference signal or physical downlink shared channel puncturing. The communication manager 1506 may request configuration of a channel state information interference measurement resource.

The reception component 1502 may receive a communication configuration associated with configuring the channel state information interference measurement resource. The communication manager 1506 may determine the set of interference patterns based at least in part on the channel state information interference measurement resource. The communication manager 1506 may map a set of identifiers to the set of interference patterns. The communication manager 1506 may identify one or more interference patterns, of the set of interference patterns, in one or more communications using a corresponding one or more identifiers, of the set of identifiers.

The reception component 1502 may receive information identifying a resource for identifying an update to the set of interference patterns, the resource being a periodic resource or a dynamically configured resource. The transmission component 1504 may transmit information identifying the update to the set of interference patterns using the resource. The reception component 1502 may receive downlink control information identifying communication configuration information, the downlink control information being based at least in part on the report. The reception component 1502 may receive, from a plurality of network nodes, a set of downlink messages. The transmission component 1504 may transmit, as a response to the set of downlink messages, one or more CSI reports, wherein a quantity of the one or more CSI reports is based at least in part on a characteristic of the set of downlink messages.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
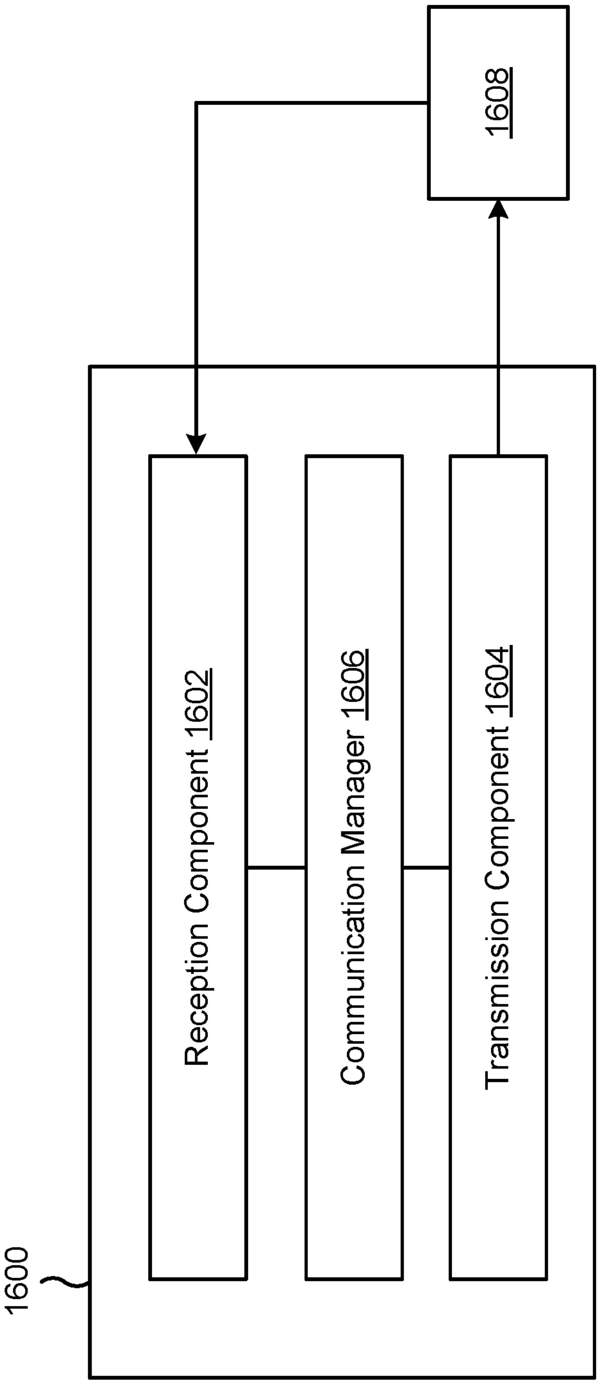

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 150 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 9-10. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2. In some aspects, the reception component 1602 and/or the transmission component 1604 may include or may be included in a network interface. The network interface may be configured to obtain and/or output signals for the apparatus 1600 via one or more communications links, such as a backhaul link, a midhaul link, and/or a fronthaul link.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

The reception component 1602 may receive a capability indicator identifying an interference pattern monitoring capability. The transmission component 1604 may transmit, based at least in part on receiving the capability indicator, a request to monitor for a set of interference patterns. The reception component 1602 may receive, as a response to the request, a report regarding the set of interference patterns.

The transmission component 1604 may transmit a communication configuration associated with configuring demodulation reference signal or physical downlink shared channel puncturing. The reception component 1602 may receive a request for configuration of a channel state information interference measurement resource. The transmission component 1604 may transmit a communication configuration associated with configuring the channel state information interference measurement resource.

The transmission component 1604 may transmit information identifying a resource for identifying an update to the set of interference patterns, the resource being a periodic resource or a dynamically configured resource.

The reception component 1602 may receive information identifying the update to the set of interference patterns using the resource. The transmission component 1604 may transmit downlink control information identifying communication configuration information, the downlink control information being based at least in part on the report. The transmission component 1604 may transmit, from a plurality of network nodes, a set of downlink messages. The reception component 1602 may receive, as a response to the set of downlink messages, one or more CSI reports, wherein a quantity of the one or more CSI reports is based at least in part on a characteristic of the set of downlink messages.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: transmitting a capability indicator identifying an interference pattern monitoring capability; receiving, based at least in part on transmitting the capability indicator, a request to monitor for a set of interference patterns; and transmitting, as a response to the request, a report regarding the set of interference patterns.

Aspect 2: The method of Aspect 1, wherein the interference pattern monitoring capability includes a maximum quantity of interference patterns for monitoring or tracking.

Aspect 3: The method of any of Aspects 1-2, wherein the interference pattern monitoring capability is specific to one or more bandwidth parts or carriers.

Aspect 4: The method of any of Aspects 1-3, wherein the request to monitor for the set of interference patterns includes a request to identify a pattern or a source of the set of interference patterns.

Aspect 5: The method of any of Aspects 1-4, further comprising: determining the set of interference patterns based at least in part on at least one of: a demodulation reference signal, an interference metric, or a noise metric.

Aspect 6: The method of any of Aspects 1-5, further comprising: receiving a communication configuration associated with configuring demodulation reference signal or physical downlink shared channel puncturing; and determining the set of interference patterns based at least in part on the demodulation reference signal or physical downlink shared channel puncturing.

Aspect 7: The method of any of Aspects 1-6, further comprising: requesting configuration of a channel state information interference measurement resource; receiving a communication configuration associated with configuring the channel state information interference measurement resource; and determining the set of interference patterns based at least in part on the channel state information interference measurement resource.

Aspect 8: The method of any of Aspects 1-7, further comprising: mapping a set of identifiers to the set of interference patterns; and identifying one or more interference patterns, of the set of interference patterns, in one or more communications using a corresponding one or more identifiers, of the set of identifiers.

Aspect 9: The method of any of Aspects 1-8, wherein the report includes information identifying at least one of: an identifier mapped to an interference pattern of the set of interference patterns, an interference duration, an interference frequency, a predicted on duration, a rank, an interference power, a predicted end to the interference pattern, a predicted next interference pattern of the set of interference patterns, or a previously observed interference pattern of the set of interference patterns.

Aspect 10: The method of any of Aspects 1-9, further comprising: receiving information identifying a resource for identifying an update to the set of interference patterns, the resource being a periodic resource or a dynamically configured resource; and transmitting information identifying the update to the set of interference patterns using the resource.

Aspect 11: The method of any of Aspects 1-10, wherein the report is included in a channel state information configuration report.

Aspect 12: The method of any of Aspects 1-11, further comprising: receiving downlink control information identifying communication configuration information, the downlink control information being based at least in part on the report.

Aspect 13: A method of wireless communication performed by a user equipment (UE), comprising: receiving, from a plurality of network nodes, a set of downlink messages; and transmitting, as a response to the set of downlink messages, one or more channel state information (CSI) reports, wherein a quantity of the one or more CSI reports is based at least in part on a characteristic of the set of downlink messages.

Aspect 14: The method of Aspect 13, wherein the one or more CSI reports include a single compressed CSI report or a plurality of non-compressed CSI reports.

Aspect 15: The method of any of Aspects 13-14, wherein the quantity of CSI reports is based at least in part on a quantity of downlink messages in the set of downlink messages.

Aspect 16: The method of any of Aspects 13-15, wherein the quantity of CSI reports is based at least in part on at least one of: a control resource set, a search space, a quantity of codewords, a quantity of transmission configuration indicator states, a transmission mode, an explicit indication from at least one network node of the plurality of network nodes, whether frequency hopping is enabled, or a type of multiplexing that is enabled.

Aspect 17: The method of any of Aspects 13-16, wherein the one or more CSI reports are associated with one or more low-density parity check iterations.

Aspect 18: The method of any of Aspects 13-17, wherein the one or more CSI reports include one or more repetition indicators for the plurality of network nodes or one or more redundancy version indicators for the plurality of network nodes.

Aspect 19: A method of wireless communication performed by a network node, comprising: receiving a capability indicator identifying an interference pattern monitoring capability; transmitting, based at least in part on receiving the capability indicator, a request to monitor for a set of interference patterns; and receiving, as a response to the request, a report regarding the set of interference patterns.

Aspect 20: The method of Aspect 19, wherein the interference pattern monitoring capability includes a maximum quantity of interference patterns for monitoring or tracking.

Aspect 21: The method of any of Aspects 19-20, wherein the interference pattern monitoring capability is specific to one or more bandwidth parts or carriers.

Aspect 22: The method of any of Aspects 19-21, wherein the request to monitor for the set of interference patterns includes a request to identify a pattern or a source of the set of interference patterns.

Aspect 23: The method of any of Aspects 19-22, wherein the set of interference patters is based at least in part on at least one of: a demodulation reference signal, an interference metric, or a noise metric.

Aspect 24: The method of any of Aspects 19-23, further comprising: transmitting a communication configuration associated with configuring demodulation reference signal or physical downlink shared channel puncturing.

Aspect 25: The method of any of Aspects 19-24, further comprising: receiving a request for configuration of a channel state information interference measurement resource; transmitting a communication configuration associated with configuring the channel state information interference measurement resource.

Aspect 26: The method of any of Aspects 19-25, wherein a set of identifiers map to the set of interference patterns.

Aspect 27: The method of any of Aspects 19-26, wherein the report includes information identifying at least one of: an identifier mapped to an interference pattern of the set of interference patterns, an interference duration, an interference frequency, a predicted on duration, a rank, an interference power, a predicted end to the interference pattern, a predicted next interference pattern of the set of interference patterns, or a previously observed interference pattern of the set of interference patterns.

Aspect 28: The method of any of Aspects 19-27, further comprising: transmitting information identifying a resource for identifying an update to the set of interference patterns, the resource being a periodic resource or a dynamically configured resource; and receiving information identifying the update to the set of interference patterns using the resource.

Aspect 29: The method of any of Aspects 19-28, wherein the report is included in a channel state information configuration report.

Aspect 30: The method of any of Aspects 19-29, further comprising: transmitting downlink control information identifying communication configuration information, the downlink control information being based at least in part on the report.

Aspect 31: A method of wireless communication performed by a network node, comprising: transmitting, from a plurality of network nodes, a set of downlink messages; and receiving, as a response to the set of downlink messages, one or more channel state information (CSI) reports, wherein a quantity of the one or more CSI reports is based at least in part on a characteristic of the set of downlink messages.

Aspect 32: The method of Aspect 31, wherein the one or more CSI reports include a single compressed CSI report or a plurality of non-compressed CSI reports.

Aspect 33: The method of any of Aspects 31-32, wherein the quantity of CSI reports is based at least in part on a quantity of downlink messages in the set of downlink messages.

Aspect 34: The method of any of Aspects 31-33, wherein the quantity of CSI reports is based at least in part on at least one of: a control resource set, a search space, a quantity of codewords, a quantity of transmission configuration indicator states, a transmission mode, an explicit indication from at least one network node of the plurality of network nodes, whether frequency hopping is enabled, or a type of multiplexing that is enabled.

Aspect 35: The method of any of Aspects 31-34, wherein the one or more CSI reports are associated with one or more low-density parity check iterations.

Aspect 36: The method of any of Aspects 31-35, wherein the one or more CSI reports include one or more repetition indicators for the plurality of network nodes or one or more redundancy version indicators for the plurality of network nodes.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

transmit a capability indicator identifying an interference pattern monitoring capability;

receive, based at least in part on the transmission of the capability indicator, a request to monitor for a set of interference patterns; and transmit, as a response to the request, a report regarding the set of interference patterns, wherein the set of interference patterns is identifiable based at least in part on a punctured demodulation reference signal.

2. The UE of claim 1, wherein the interference pattern monitoring capability includes a maximum quantity of interference patterns to be monitored or tracked.

3. The UE of claim 1, wherein the interference pattern monitoring capability is specific to one or more bandwidth parts or carriers.

4. The UE of claim 1, wherein the request to monitor for the set of interference patterns includes a request to identify a pattern or a source of the set of interference patterns.

5. The UE of claim 1, wherein the one or more processors are further configured to:

determine the set of interference patterns based at least in part on at least one of:

the punctured demodulation reference signal, an interference metric, or a noise metric.

6. The UE of claim 1, wherein the one or more processors are further configured to:

receive a communication configuration associated with configuration of demodulation reference signal or physical downlink shared channel puncturing; and determine the set of interference patterns based at least in part on the demodulation reference signal or physical downlink shared channel puncturing.

7. The UE of claim 1, wherein the one or more processors are further configured to:

request configuration of a channel state information interference measurement resource;

receive a communication configuration associated with configuration of the channel state information interference measurement resource; and determine the set of interference patterns based at least in part on the channel state information interference measurement resource.

8. The UE of claim 1, wherein the one or more processors are further configured to:

map a set of identifiers to the set of interference patterns; and identify one or more interference patterns, of the set of interference patterns, in one or more communications using a corresponding one or more identifiers, of the set of identifiers.

9. The UE of claim 1, wherein the report includes information identifying at least one of:

an identifier mapped to an interference pattern of the set of interference patterns, an interference duration, an interference frequency, a predicted on duration, a rank, an interference power, a predicted end to the interference pattern, a predicted next interference pattern of the set of interference patterns, or a previously observed interference pattern of the set of interference patterns.

10. The UE of claim 1, wherein the one or more processors are further configured to:

receive information identifying a resource for identification of an update to the set of interference patterns, the resource being a periodic resource or a dynamically configured resource; and transmit information identifying the update to the set of interference patterns using the resource.

11. The UE of claim 1, wherein the report is included in a channel state information configuration report.

12. The UE of claim 1, wherein the one or more processors are further configured to:

receive downlink control information identifying communication configuration information, the downlink control information being based at least in part on the report.

13. A network node for wireless communication, comprising:

one or more memories; and one or more processors, coupled to the one or more memories, configured to:

receive a capability indicator identifying an interference pattern monitoring capability;

transmit, based at least in part on the reception of the capability indicator, a request to monitor for a set of interference patterns; and receive, as a response to the request, a report regarding the set of interference patterns, wherein the set of interference patterns is identifiable based at least in part on a punctured demodulation reference signal.

14. The network node of claim 13, wherein the interference pattern monitoring capability includes a maximum quantity of interference patterns to be monitored or tracked.

15. The network node of claim 13, wherein the interference pattern monitoring capability is specific to one or more bandwidth parts or carriers.

16. The network node of claim 13, wherein the request to monitor for the set of interference patterns includes a request to identify a pattern or a source of the set of interference patterns.

17. The network node of claim 13, wherein the set of interference patterns is based at least in part on at least one of:
the punctured demodulation reference signal,
an interference metric, or
a noise metric.

18. The network node of claim 13, wherein the one or more processors are further configured to:
transmit a communication configuration associated with configuration of demodulation reference signal or physical downlink shared channel puncturing.

19. The network node of claim 13, wherein the one or more processors are further configured to:
receive a request for configuration of a channel state information interference measurement resource; and
transmit a communication configuration associated with configuration of the channel state information interference measurement resource.

20. The network node of claim 13, wherein a set of identifiers map to the set of interference patterns.

21. The network node of claim 13, wherein the report includes information identifying at least one of:
an identifier mapped to an interference pattern of the set of interference patterns,
an interference duration,
an interference frequency,
a predicted on duration,
a rank,
an interference power,
a predicted end to the interference pattern,
a predicted next interference pattern of the set of interference patterns, or
a previously observed interference pattern of the set of interference patterns.

22. A method for wireless communication performed by a user equipment (UE), comprising:
transmitting a capability indicator identifying an interference pattern monitoring capability;
receiving, based at least in part on transmitting the capability indicator, a request to monitor for a set of interference patterns; and
transmitting, as a response to the request, a report regarding the set of interference patterns, wherein the set of interference patterns is identifiable based at least in part on a punctured demodulation reference signal.

23. The method of claim 22, wherein the interference pattern monitoring capability includes a maximum quantity of interference patterns for monitoring or tracking.

24. The method of claim 22, wherein the interference pattern monitoring capability is specific to one or more bandwidth parts or carriers.

25. The method of claim 22, wherein the request to monitor for the set of interference patterns includes a request to identify a pattern or a source of the set of interference patterns.

26. The method of claim 22, further comprising:
determining the set of interference patterns based at least in part on at least one of:
the punctured demodulation reference signal,
an interference metric, or
a noise metric.

27. The method of claim 22, further comprising:
receiving a communication configuration associated with configuring demodulation reference signal or physical downlink shared channel puncturing; and
determining the set of interference patterns based at least in part on the demodulation reference signal or physical downlink shared channel puncturing.

28. The method of claim 22, further comprising:
requesting configuration of a channel state information interference measurement resource;
receiving a communication configuration associated with configuring the channel state information interference measurement resource; and
determining the set of interference patterns based at least in part on the channel state information interference measurement resource.

29. The UE of claim 1, wherein the set of interference patterns is estimated using a recurrent neural network estimation technique that is based at least in part on the punctured demodulation reference signal.

30. A method for wireless communication performed by a network node, comprising:
receiving a capability indicator identifying an interference pattern monitoring capability;
transmitting, based at least in part on receiving the capability indicator, a request to monitor for a set of interference patterns; and
receiving, as a response to the request, a report regarding the set of interference patterns, wherein the set of interference patterns is identifiable based at least in part on a punctured demodulation reference signal.

* * * * *